(12) United States Patent
Uenaka

(10) Patent No.: US 7,885,524 B2
(45) Date of Patent: Feb. 8, 2011

(54) PHOTOGRAPHIC APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 28 days.

(21) Appl. No.: 12/411,461

(22) Filed: Mar. 26, 2009

(65) Prior Publication Data

US 2009/0245773 A1   Oct. 1, 2009

(30) Foreign Application Priority Data

Mar. 31, 2008   (JP) .............................. 2008-090838

(51) Int. Cl.
*G03B 17/00* (2006.01)
*H04N 5/228* (2006.01)

(52) U.S. Cl. ..................... 396/55; 348/208.2; 348/208.7

(58) Field of Classification Search ................... 396/55, 396/52, 53, 50; 348/208.99, 208.1, 208.2, 348/208.4, 208.7
See application file for complete search history.

(56) References Cited

U.S. PATENT DOCUMENTS

| 5,155,520 | A  | * | 10/1992 | Nagasaki et al. ............... 396/53 |
| 7,307,653 | B2 | * | 12/2007 | Dutta ....................... 348/208.7 |
| 2008/0012947 | A1 | | 1/2008 | Uenaka |
| 2008/0012948 | A1 | | 1/2008 | Uenaka |
| 2008/0013933 | A1 | | 1/2008 | Uenaka |
| 2009/0245768 | A1 | | 10/2009 | Uenaka |
| 2009/0245769 | A1 | | 10/2009 | Uenaka |
| 2009/0245770 | A1 | | 10/2009 | Uenaka |
| 2009/0245771 | A1 | | 10/2009 | Uenaka |
| 2009/0245774 | A1 | | 10/2009 | Uenaka |

FOREIGN PATENT DOCUMENTS

JP    2006-071743 A    3/2006

OTHER PUBLICATIONS

English language Abstract and translation of JP 2006-071743 A, Mar. 16, 2006.

* cited by examiner

*Primary Examiner*—Rochelle-Ann J Blackman
(74) *Attorney, Agent, or Firm*—Greenblum & Bernstein P.L.C.

(57) ABSTRACT

A photographic apparatus comprises a movable platform, a translational movement switch, a rotational movement switch, and a controller. The movable platform has an imager, and is movable and rotatable in an xy plane. The translational movement switch is for selecting ON/OFF states of a translational movement including a first stabilization and a second stabilization. The first stabilization moves the movable platform in the x direction for correcting hand shake caused by yaw. The second stabilization moves the movable platform in the y direction for correcting hand shake caused by pitch. The rotational movement switch is for selecting ON/OFF states of a rotational movement that rotates the movable platform in the xy plane. The controller controls the movable platform for the translational movement on the basis of the state of the translational movement switch, and the rotational movement on the basis of the state of the rotational movement switch.

4 Claims, 21 Drawing Sheets

Direction of gravitational force

Direction of gravitational force

PHOTOGRAPHIC APPARATUS

BACKGROUND OF THE INVENTION

1. Field of the Invention

The present invention relates to a photographic apparatus, and in particular, to a photographic apparatus that performs a rotational movement such as an inclination correction or the like.

2. Description of the Related Art

There is known a type of image stabilization (also known as anti-shake, but hereinafter, simply "stabilization") apparatus for a photographic apparatus. The image stabilization apparatus corrects for the effects of hand shake by moving a movable platform including an image stabilization lens or by moving an imager (an imaging sensor) in an xy plane perpendicular to an optical axis of a taking lens of the photographic apparatus, in accordance with the amount of hand shake that occurs during the imaging process.

Japanese unexamined patent publication (KOKAI) No. 2006-71743 discloses an image stabilization apparatus that calculates hand-shake quantity on the basis of hand shake due to yaw, pitch, and roll, and then performs a stabilization on the basis of the hand-shake quantity (the first, second, and third hand-shake angles).

In this stabilization operation, the following stabilization functions are performed: a translational movement including a first stabilization that corrects the hand shake caused by yaw and a second stabilization that corrects the hand shake caused by pitch, and a rotational movement including a third stabilization that corrects the hand shake caused by roll.

In the translational movement, the movable platform is moved in the xy plane without rotational movement.

In the rotational movement, the movable platform is rotated in the xy plane.

However, the rotational movement of the movable platform for the third stabilization limits the movable ranges of the movable platform in the x and y directions available to translational movement (the first and second stabilizations).

When the movable ranges of the movable platform available for the translational movement are limited, the translational movement cannot be performed accurately.

Conversely, the translational movement limits the movable ranges of the movable platform for rotational movement, thus preventing it from being performed accurately.

SUMMARY OF THE INVENTION

Therefore, an object of the present invention is to provide a photographic apparatus that performs both the rotational and translational movements effectively.

According to the present invention, a photographic apparatus comprises a movable platform, a translational movement switch, a rotational movement switch, and a controller. The movable platform has an imager that captures an optical image through a taking lens, and is movable and rotatable in an xy plane perpendicular to an optical axis of the taking lens. The translational movement switch is used for selecting ON/OFF states of a translational movement including at least one of a first stabilization and a second stabilization. The first stabilization moves the movable platform in the x direction for correcting hand shake caused by yaw. The second stabilization moves the movable platform in the y direction for correcting hand shake caused by pitch. The x direction is perpendicular to the optical axis. The y direction is perpendicular to the x direction and the optical axis. The rotational movement switch is used for selecting ON/OFF states of a rotational movement that rotates the movable platform in the xy plane. The controller controls the movable platform for the translational movement on the basis of the state of the translational movement switch, and the rotational movement on the basis of the state of the rotational movement switch.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
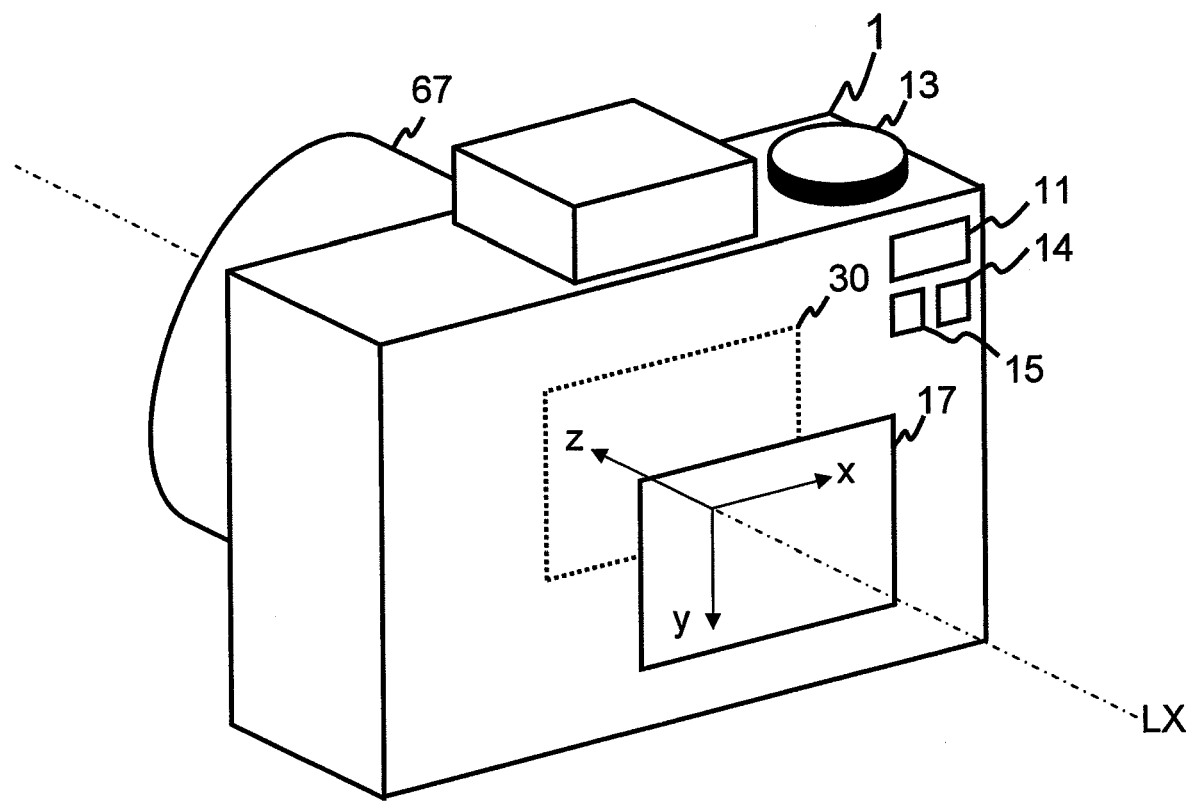
FIG. 1 is a perspective view of the embodiment of the photographic apparatus as viewed from the rear.

The present invention is described below with reference to the embodiment shown in the drawings. In the embodiment, the photographic apparatus 1 is a digital camera. A camera lens (i.e. taking lens) 67 of the photographic apparatus 1 has the optical axis LX.

By way of orientation in the embodiment, the x direction, the y direction, and the z direction are defined (see FIG. 1). The x direction is the direction perpendicular to the optical axis LX. The y direction is the direction perpendicular to the optical axis LX and the x direction. The z direction is the direction parallel to the optical axis LX and perpendicular to both the x direction and the y direction.

The relationships between the direction of gravitational force and the x direction, the y direction, and the z direction, change according to the orientation of the photographic apparatus 1.

For example, when the photographic apparatus 1 is held in the first horizontal orientation, in other words, when the photographic apparatus 1 is held horizontally and the upper surface of the photographic apparatus 1 faces upward (see FIG. 2), the x direction and the z direction are perpendicular to the direction of gravitational force and the y direction is parallel to the direction of gravitational force.

Figure 9:
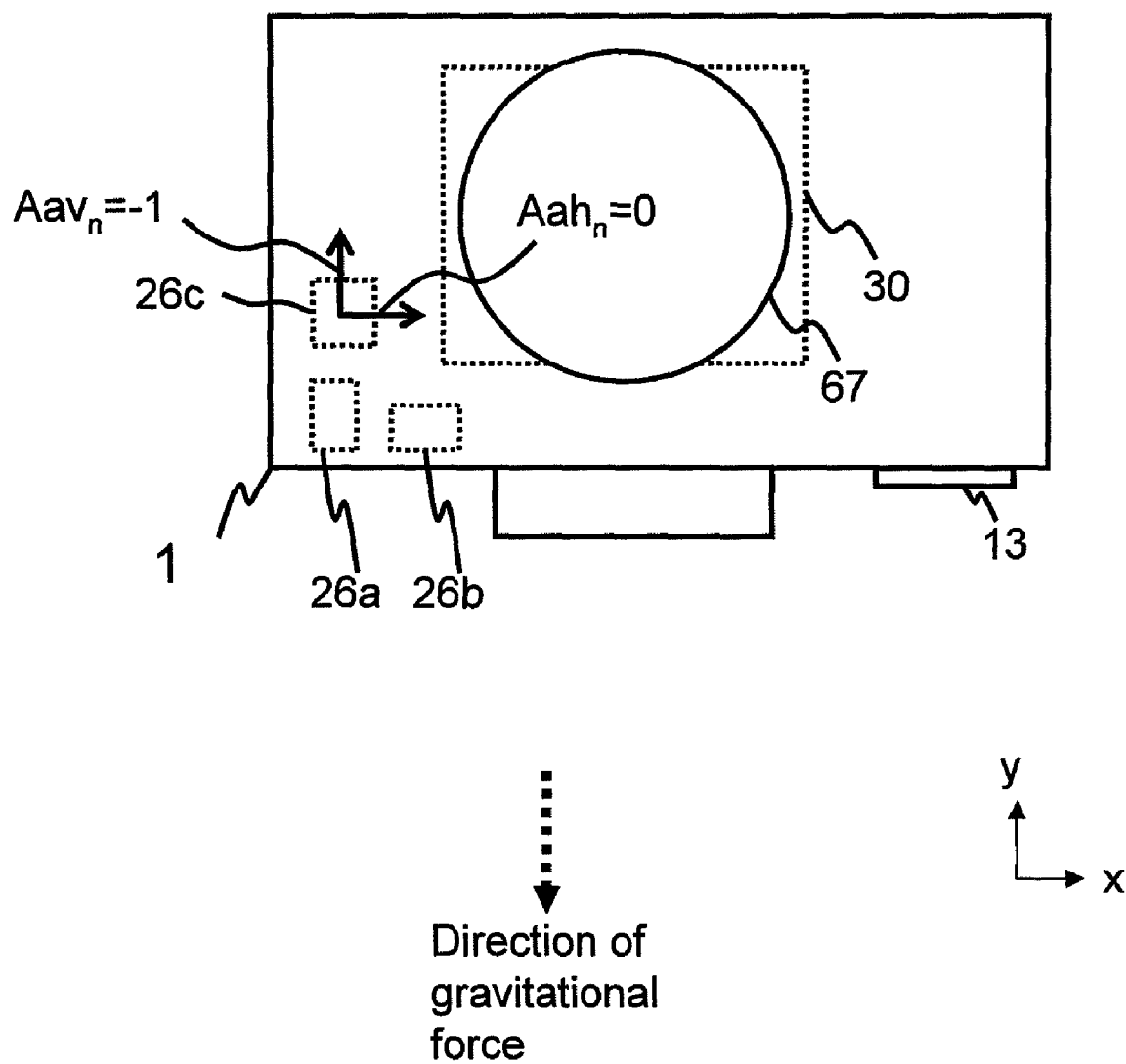
FIG. 9 is a front view of the photographic apparatus, when the photographic apparatus is held in the second horizontal orientation.

When the photographic apparatus 1 is held in the second horizontal orientation, in other words, when the photographic apparatus 1 is held horizontally and the lower surface of the photographic apparatus 1 faces upward (see FIG. 9), the x direction and the z direction are perpendicular to the direction of gravitational force and the y direction is parallel to the direction of gravitational force.

Figure 10:
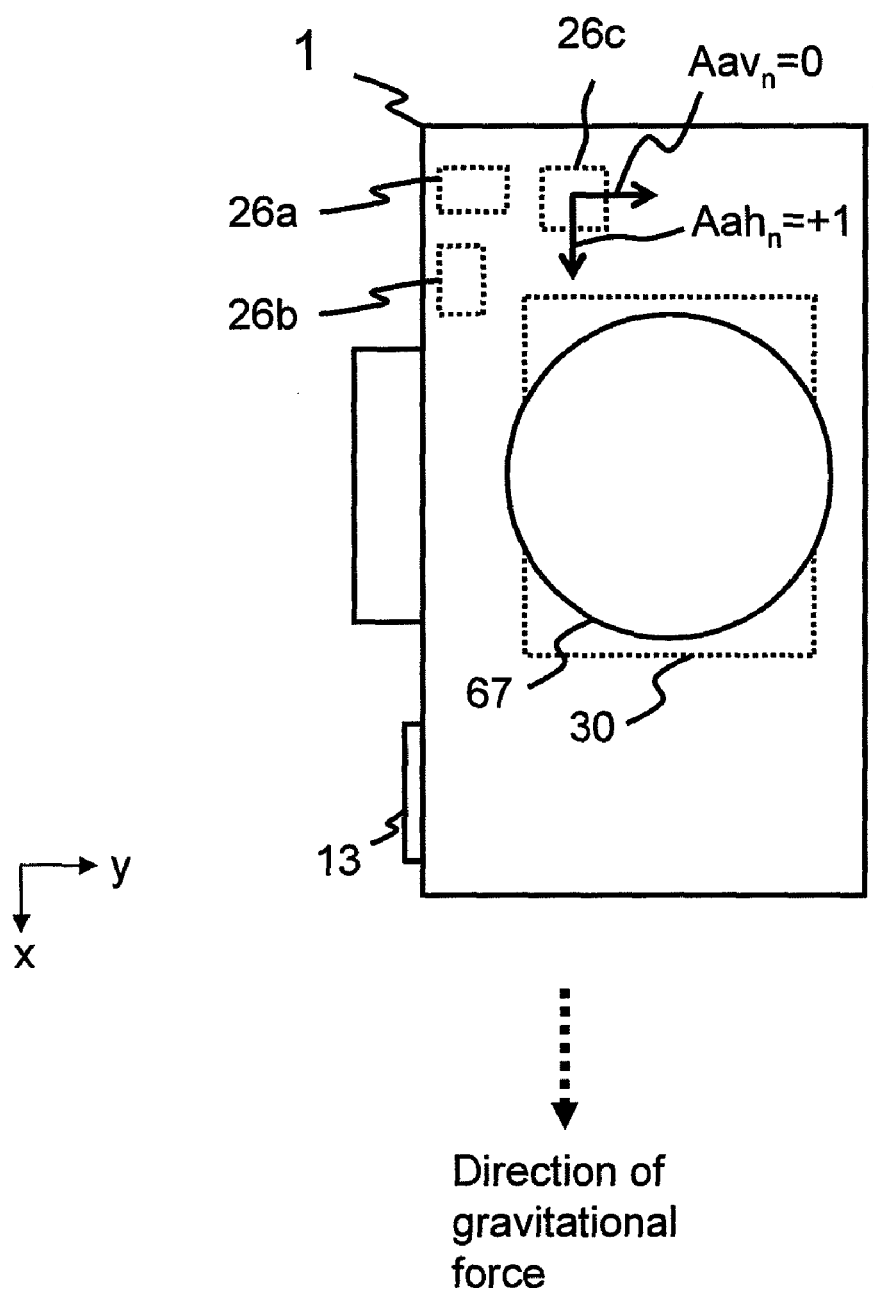
FIG. 10 is a front view of the photographic apparatus, when the photographic apparatus is held in the first vertical orientation.

When the photographic apparatus 1 is held in the first vertical orientation, in other words, when the photographic apparatus 1 is held vertically and one of the side surfaces of the photographic apparatus 1 faces upward (see FIG. 10), the x direction is parallel to the direction of gravitational force and the y direction and the z direction are perpendicular to the direction of gravitational force.

Figure 11:
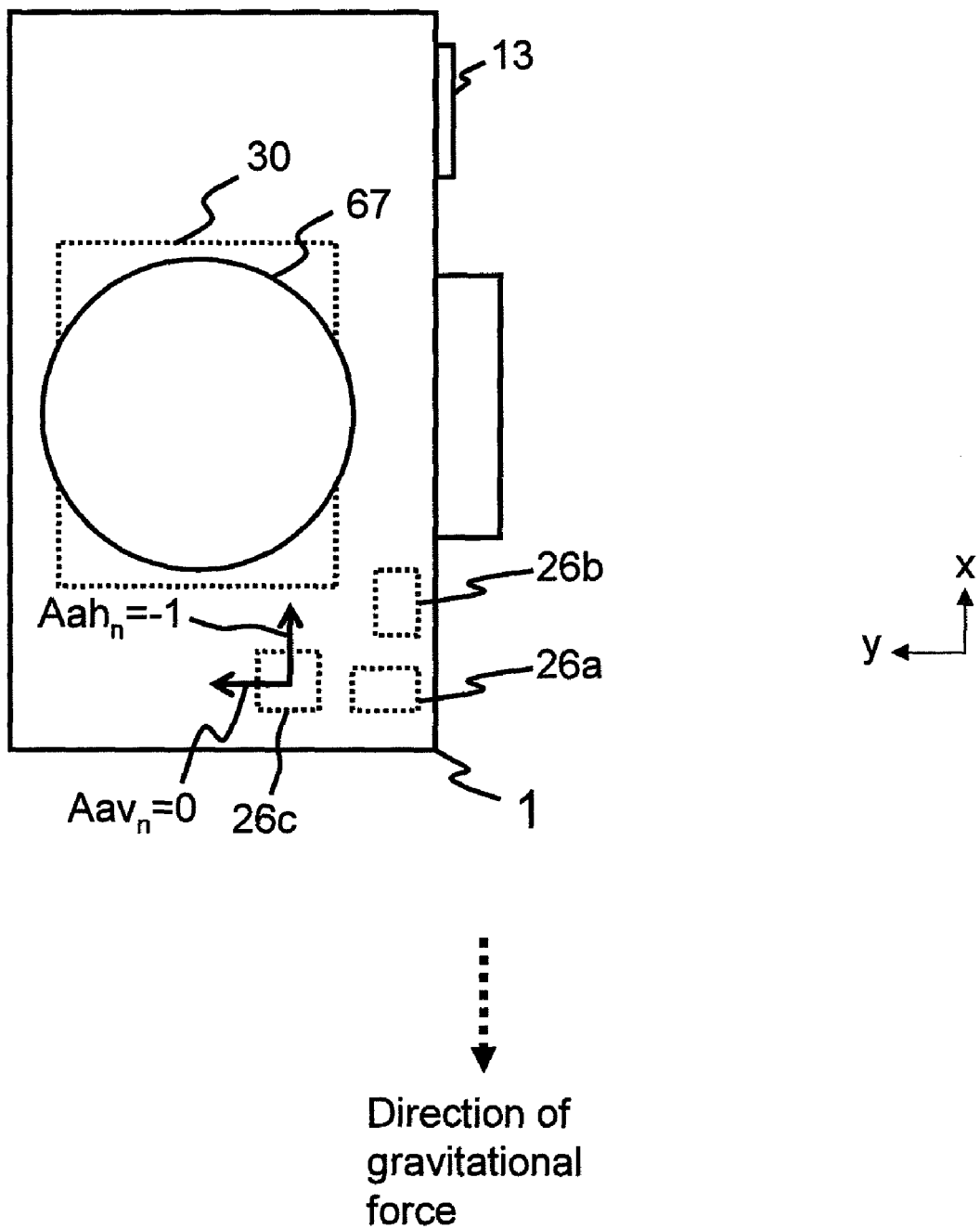
FIG. 11 is a front view of the photographic apparatus, when the photographic apparatus is held in the second vertical orientation.

When the photographic apparatus 1 is held in the second vertical orientation, in other words, when the photographic apparatus 1 is held vertically and the other side surface of the photographic apparatus 1 faces upward (see FIG. 11), the x direction is parallel to the direction of gravitational force and the y direction and the z direction are perpendicular to the direction of gravitational force.

When the front surface of the photographic apparatus 1 faces in the direction of gravitational force, the x direction and the y direction are perpendicular to the direction of gravitational force and the z direction is parallel to the direction of gravitational force. The front surface of the photographic apparatus 1 is the side on which camera lens 67 is attached.

Figure 2:
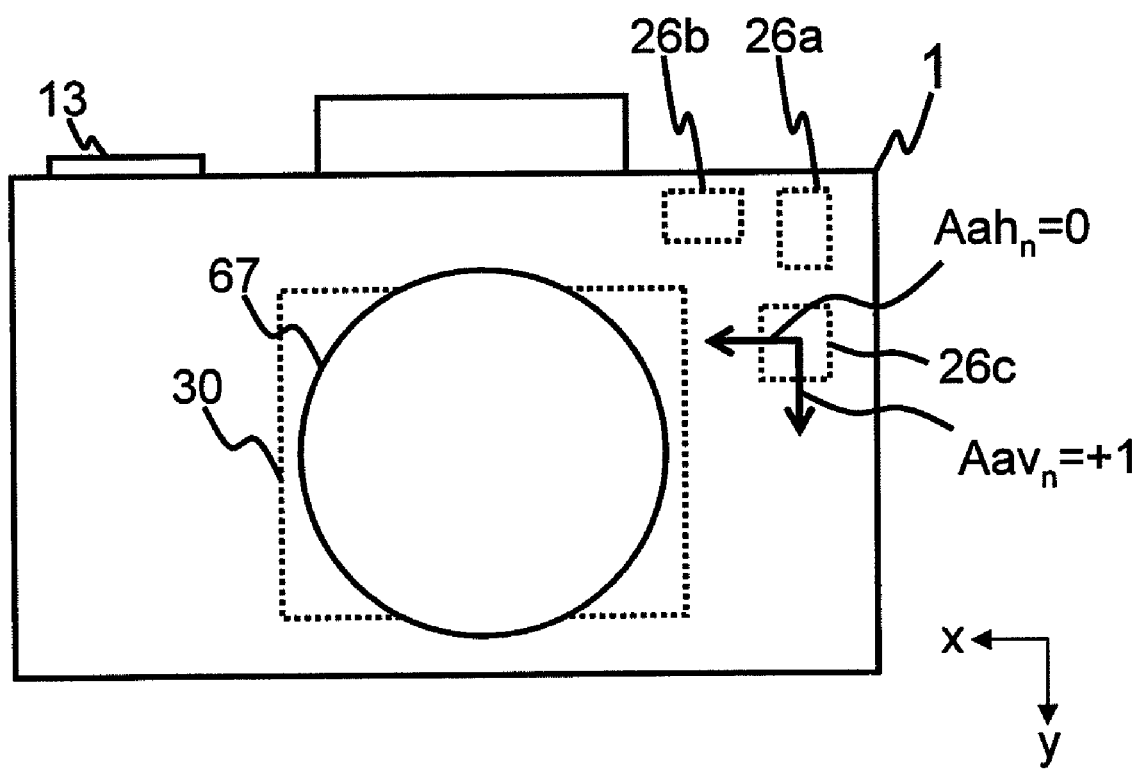
FIG. 2 is a front view of the photographic apparatus, when the photographic apparatus is held in the first horizontal orientation.
Figure 3:
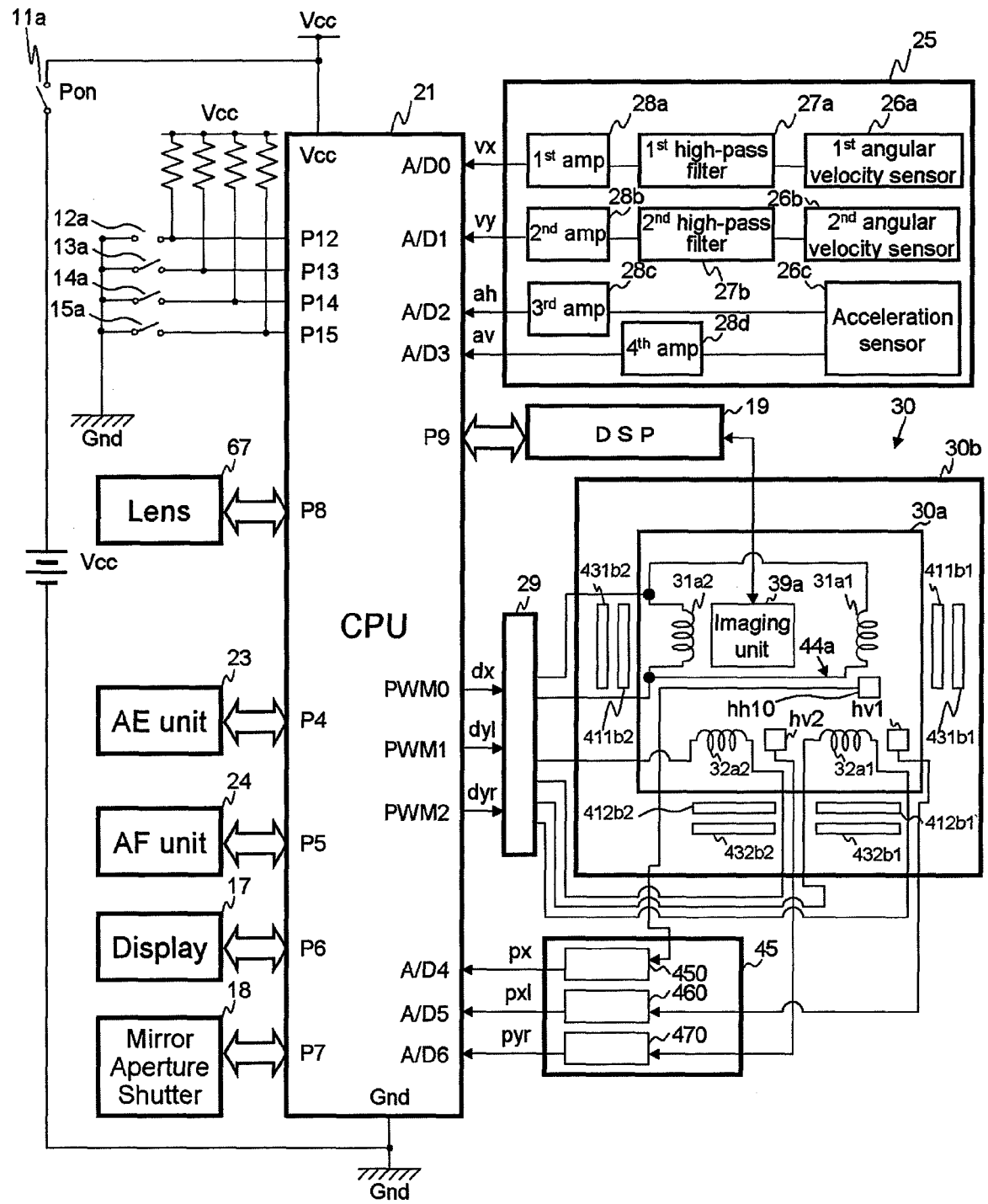
FIG. 3 is a circuit construction diagram of the photographic apparatus.

The imaging part of the photographic apparatus 1 comprises a PON button 11, a PON switch 11a, a photometric switch 12a, a shutter release button 13, a shutter release switch 13a for an exposure operation, a stabilization button 14, a stabilization switch 14a, a first inclination correction button 15, a first inclination correction switch 15a, a display 17 such as an LCD monitor or the like, a mirror-aperture-shutter unit 18, a DSP 19, a CPU 21, an AE (automatic exposure) unit 23, an AF (automatic focus) unit 24, an imaging unit 39a in the correction unit 30, and the camera lens 67 (see FIGS. 1, 2, and 3).

Whether the PON switch 11a is in the ON state or OFF state is determined by the state of the PON button 11. The ON/OFF states of the photographic apparatus 1 correspond to the ON/OFF states of the PON switch 11a.

The subject image is captured as an optical image through the camera lens 67 by the imaging unit 39a, and the captured image is displayed on the display 17. The subject image can be optically observed through the optical finder (not depicted).

When the shutter release button 13 is partially depressed by the operator, the photometric switch 12a changes to the ON state so that the photometric operation, the AF sensing operation, and the focusing operation are performed.

When the shutter release button 13 is fully depressed by the operator, the shutter release switch 13a changes to the ON state so that the imaging operation by the imaging unit 39a (the imaging apparatus) is performed, and the captured image is stored.

The CPU 21 performs a release-sequence operation including the imaging operation after the shutter release switch 13a is set to the ON state.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter corresponding to the ON state of the shutter release switch 13a.

The camera lens 67 is an interchangeable lens of the photographic apparatus 1 and is connected to port P8 of the CPU 21. The camera lens 67 outputs the lens information including the lens coefficient F etc., stored in a built-in ROM in the camera lens 67, to the CPU 21, when the photographic apparatus 1 is set to the ON state.

The DSP 19 is connected to port P9 of the CPU 21 and to the imaging unit 39a. Based on a command from the CPU 21, the DSP 19 performs the calculation operations, such as the image-processing operation, etc., on the image signal obtained by the imaging operation of the imaging unit 39a.

The CPU 21 is a control apparatus that controls each part of the photographic apparatus 1 in its imaging operation, and in its stabilization (i.e. anti-shake) and inclination correction.

The stabilization and inclination correction includes both the movement control of the movable platform 30a and position-detection efforts.

In the embodiment, the stabilization includes a first stabilization that moves the movable platform 30a in the x direction and a second stabilization that moves the movable platform 30a in the y direction.

Furthermore, the CPU 21 stores the value of the stabilization parameter SR that indicates whether the photographic apparatus 1 is in the stabilization mode or not, the value of the inclination correction parameter INC that indicates whether the photographic apparatus 1 is in the inclination correction mode or not, the value of the release-state parameter RP, and the value of the mirror state parameter MP.

The value of the release-state parameter RP changes with respect to the release-sequence operation. When the release-sequence operation is performed, the value of the release-state parameter RP is set to 1 (see steps S24 to S31 in FIG. 4), otherwise, the value of the release-state parameter RP is set (reset) to 0 (see steps S13 and S31 in FIG. 4).

Figure 4:
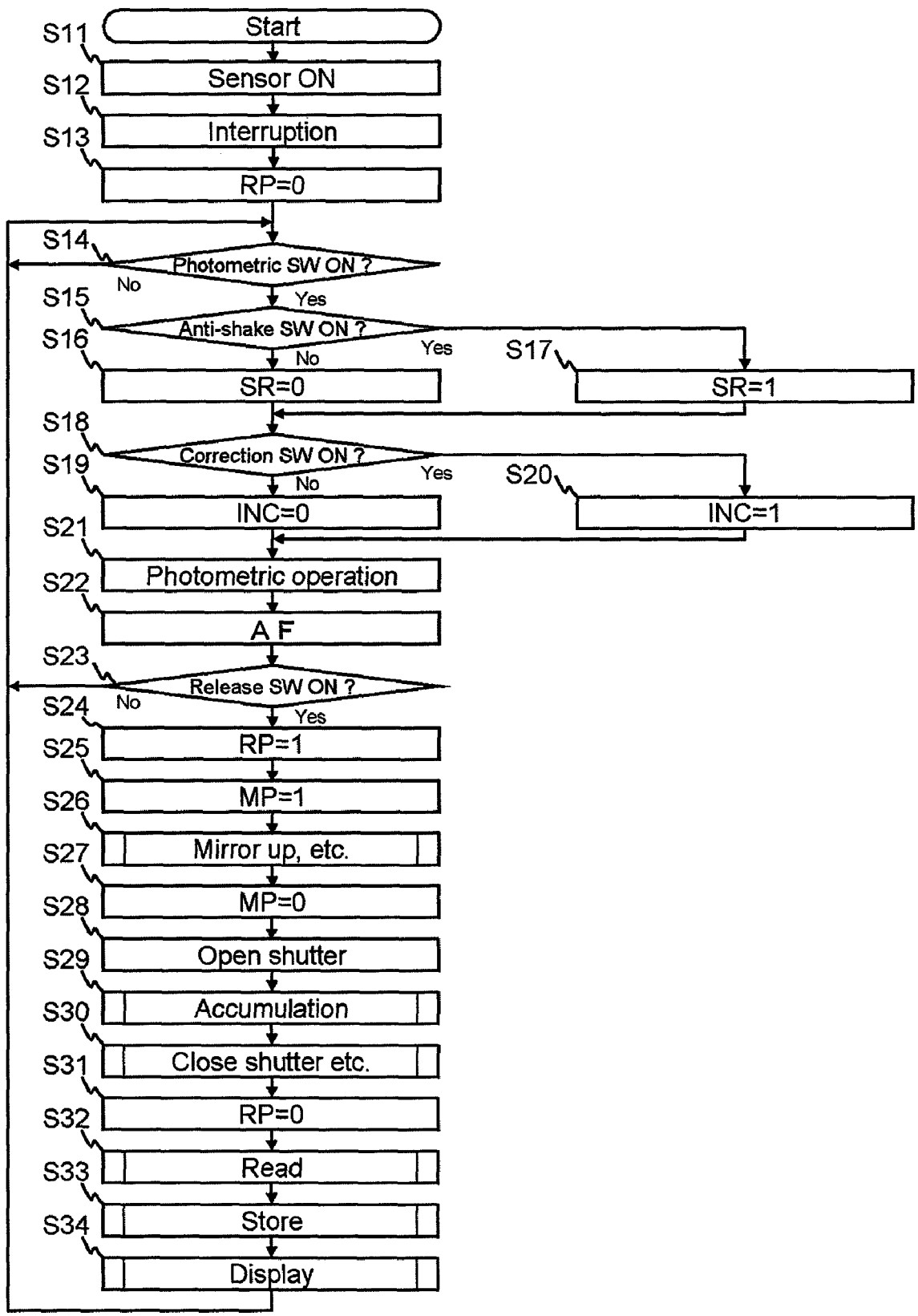
FIG. 4 is a flowchart that shows the main operation of the photographic apparatus.

While the mirror-up operation is performed before the exposure operation for the imaging operation, the value of the mirror state parameter MP is set to 1 (see step S25 in FIG. 4); otherwise, the value of the mirror state parameter MP is set to 0 (see step S27 in FIG. 4).

Whether the mirror-up operation of the photographic apparatus 1 is finished is determined by the detection of the ON/OFF states of a mechanical switch (not depicted). Whether the mirror-down operation of the photographic apparatus 1 is finished is determined by the detection of the completion of the shutter charge.

Furthermore, the CPU 21 stores the values of the first digital angular velocity signal $Vx_n$, the second digital angular velocity signal $Vy_n$, the first digital angular velocity $VVx_n$, the second digital angular velocity $VVy_n$, the first digital acceleration signal $Dah_n$, the second digital acceleration signal $Dav_n$, the first digital acceleration $Aah_n$, the second digital acceleration $Aav_n$, the first digital displacement angle $Kx_n$ (the hand-shake angle caused by yaw), the second digital displacement angle $Ky_n$ (the hand-shake angle caused by pitch), the third digital displacement angle $K\theta_n$ (the inclination angle of the photographic apparatus 1), the horizontal direction component of the position $S_n$, $Sx_n$, the vertical direction component of the position $S_n$, $Sy_n$, the rotational direction component (the inclination angle) of the position $S_n$, $S\theta_n$, the first vertical direction component of the first driving point, $Syl_n$, the second vertical direction component of the second driving point, $Syr_n$, the horizontal driving force D×n, the first vertical driving force $Dyl_n$, the second vertical driving force $Dyr_n$, the horizontal direction component of the position $P_n$ after A/D conversion, $pdx_n$, the first vertical direction component of the position $P_n$ after A/D conversion, $pdyl_n$, the second vertical direction component of the position $P_n$ after A/D conversion, $pdyr_n$, the lens coefficient F, and the hall sensor distance coefficient HSD. The hall sensor distance coefficient HSD is the relative distance between the first vertical hall sensor hv1 and the second vertical hall sensor hv2 in the x direction of the initial state (see FIG. 7).

In the initial state, the movable platform 30a is positioned at the center of its movement range in both the x and y directions, and each of the four sides of the rectangle composing the outline of the imaging surface of the imager (an imaging sensor) 39a1 is parallel to either the x direction or the y direction.

The AE unit (exposure-calculating unit) 23 performs the photometric operation and calculates photometric values based on the subject being photographed. The AE unit 23 also calculates the aperture value and the duration of the exposure operation, with respect to the photometric values, both of which are needed for the imaging operation. The AF unit 24 performs the AF sensing operation and the corresponding focusing operation, both of which are needed for the imaging operation. In the focusing operation, the camera lens 67 is re-positioned along the optical axis LX.

The stabilization and inclination correction part (the stabilization and inclination correction apparatus) of the photographic apparatus 1 comprises a stabilization button 14, a stabilization switch 14a, a first inclination correction button 15, a first inclination correction switch 15a, a display 17, a CPU 21, a detection unit 25, a driver circuit 29, a correction unit 30, a hall-sensor signal-processing unit 45, and the camera lens 67.

The ON/OFF states of the stabilization switch 14a change according to the operation state of the stabilization button 14.

Specifically, when the stabilization button 14 is depressed by the operator, the stabilization switch 14a (a translational movement switch) is changed to the ON state so that a translational movement including at least one of the first stabilization and the second stabilization, in which the detection unit 25 and the correction unit 30 are driven independently of the other operations which include the photometric operation etc., is carried out at the predetermined time interval.

The first stabilization moves the movable platform 30a in the x direction for correcting the hand shake caused by yaw, and the second stabilization moves the movable platform 30a in the y direction for correcting the hand shake caused by pitch.

When the stabilization switch 14a is in the ON state, (in other words in the stabilization mode), the stabilization parameter SR is set to 1 (SR=1). When the stabilization switch 14a is not in the ON state, (in other words in the non-stabilization mode), the stabilization parameter SR is set to 0 (SR=0). In the embodiment, the value of the predetermined time interval is set to 1 ms.

The ON/OFF states of the first inclination correction switch 15a change according to the operation state of the first inclination correction button 15.

Specifically, when the first inclination correction button 15 is depressed by the operator, the first inclination correction switch 15a (a rotational movement switch) is changed to the ON state so that the inclination correction (a rotational movement), in which the detection unit 25 and the correction unit 30 are driven independently of the other operations which include the photometric operation etc., is carried out at the predetermined time interval. When the first inclination correction switch 15a is in the ON state, (in other words, in the inclination correction mode), the inclination correction parameter INC is set to 1 (INC=1). When the first inclination correction switch 15a is not in the ON state, (in other words, in the non-inclination correction mode), the inclination correction parameter INC is set to 0 (INC=0).

In the embodiment, the operator can manually select the ON/OFF states of the stabilization and the ON/OFF states of the inclination correction independently, according to the photographic scene, the orientation of the photographic apparatus 1, etc.

For example, when the stabilization switch 14a and the first inclination correction switch 15a are set to the ON state, both the stabilization and inclination correction are performed.

Figure 21:
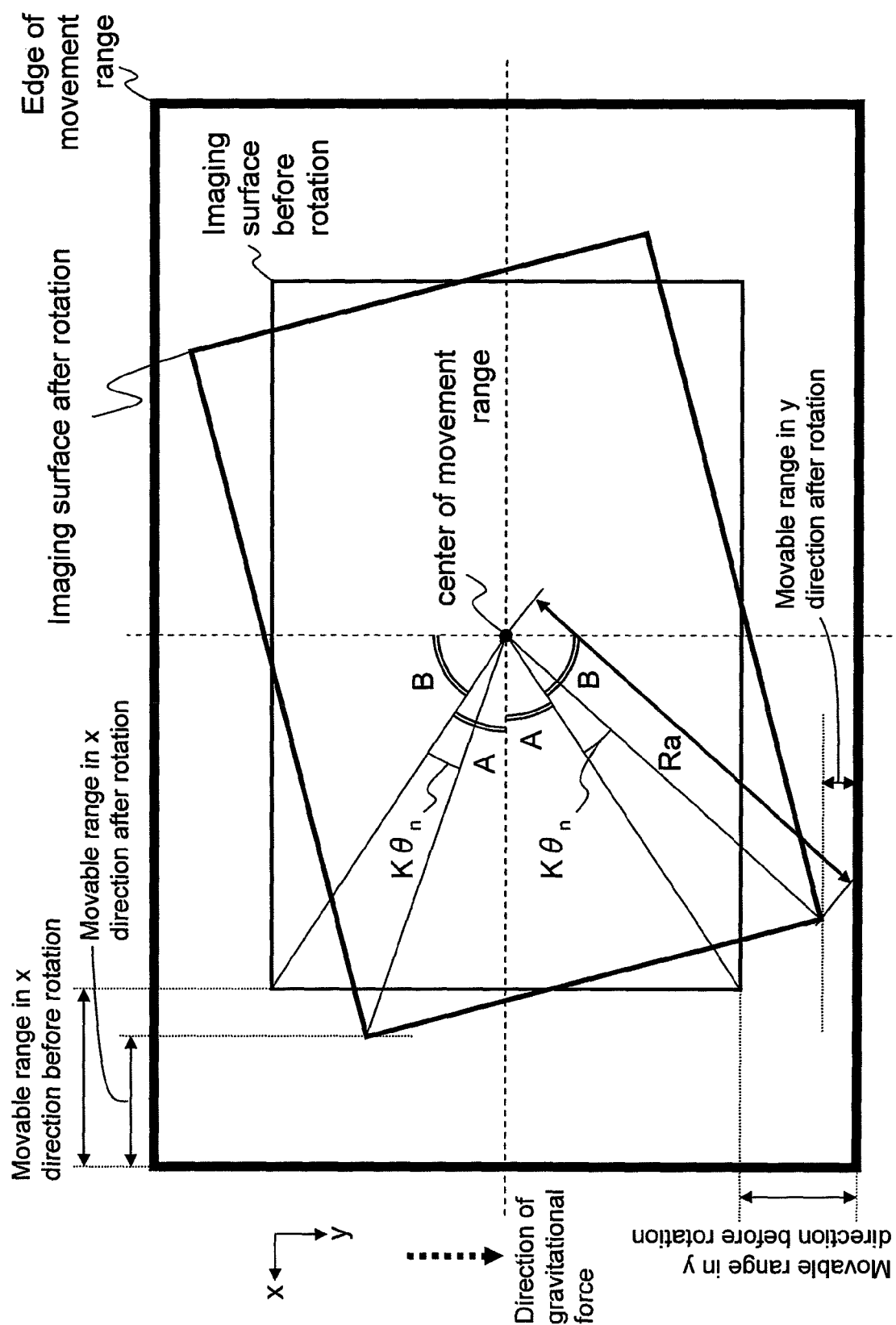
FIG. 21 shows the position relationship between the imaging surface of the imager, the movement range, the movable ranges $Hsx_n$ and $Hsy_n$ before rotation, and the movable ranges Rx and Ry after rotation.

However, in this case, the rotational movement of the movable platform 30a for the inclination correction limits the movable ranges of the movable platform 30a in the x and y directions available to the translational movement (the first stabilization and second stabilization, see FIG. 21).

When the movable ranges of the movable platform 30a available to the translational movement are limited, the translational movement cannot be performed accurately.

Similarly, the translational movement of the movable platform 30a for the stabilization limits the rotatable angle of the movable platform 30a (the movable ranges of the movable platform 30a in the x and y directions) available to the rotational movement (the inclination correction).

When the movable ranges of the movable platform 30a available to the rotational movement are limited, the rotational movement cannot be performed accurately.

Furthermore, when the stabilization switch 14a is set to the OFF state and the first inclination correction switch 15a is set to the ON state, it may be good for a shooting situation in which stabilization is not as high a priority as correcting for inclination, such as when the photographic apparatus 1 is fixed to a tripod, etc.

Furthermore, setting the stabilization switch 14a to the ON state and the first inclination correction switch 15a to the OFF state may be suitable for a shooting situation in which stabilization takes priority over inclination correction.

FIG. 21 shows the movement range of the imaging surface of the imager 39a1, including the movable range of the imaging surface in the x and y directions; however, it may be shown as the movement range of the movable platform 30a, including the movable range of the movable platform 30a in the x and y directions.

The various output commands corresponding to the input signals of these switches are controlled by the CPU 21.

The information indicating whether the photometric switch 12a is in the ON state or OFF state is input to port P12 of the CPU 21 as a 1-bit digital signal. The information indicating whether the shutter release switch 13a is in the ON or OFF state is input to port P13 of the CPU 21 as a 1-bit digital signal. Likewise, the information indicating whether the stabilization switch 14a is in the ON or OFF state is input to port P14 of the CPU 21 as a 1-bit digital signal. Likewise, the information indicating whether the first inclination correction switch 15a is in the ON or OFF state is input to port P15 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The display 17 is connected to port P6 of the CPU 21 for inputting and outputting signals.

Next, the details of the input and output relationships between the CPU 21 and the detection unit 25, the driver circuit 29, the correction unit 30, and the hall-sensor signal-processing unit 45 are explained.

The detection unit 25 has a first angular velocity sensor 26a, a second angular velocity sensor 26b, an acceleration sensor 26c, a first high-pass filter circuit 27a, a second high-pass filter circuit 27b, a first amplifier 28a, a second amplifier 28b, a third amplifier 28c, and a fourth amplifier 28d.

The first angular velocity sensor 26a detects the angular velocity of rotary motion of the photographic apparatus 1 around the axis of the y direction (the yaw). In other words, the first angular velocity sensor 26a is a gyro sensor that detects the yaw angular velocity.

The second angular velocity sensor 26b detects the angular velocity of rotary motion of the photographic apparatus 1 around the axis of the x direction (the pitch). In other words, the second angular velocity sensor 26b is a gyro sensor that detects the pitch angular velocity.

The acceleration sensor 26c detects a first gravitational component and a second gravitational component. The first gravitational component is the horizontal component of gravitational acceleration in the x direction. The second gravitational component is the vertical component of gravitational acceleration in the y direction.

The first high-pass filter circuit 27a reduces the low-frequency component of the signal output from the first angular velocity sensor 26a, because the low-frequency component of the signal output from the first angular velocity sensor 26a includes signal elements that are based on null voltage and panning motion, neither of which are related to hand shake.

Similarly, the second high-pass filter circuit 27b reduces the low-frequency component of the signal output from the second angular velocity sensor 26b, because the low-frequency component of the signal output from the second angular velocity sensor 26b includes signal elements that are based on null voltage and panning motion, neither of which are related to hand shake.

The first amplifier 28a amplifies the signal representing the yaw angular velocity, whose low-frequency component has been reduced, and outputs the analog signal to the A/D converter A/D 0 of the CPU 21 as a first angular velocity vx.

The second amplifier 28b amplifies the signal representing the pitch angular velocity, whose low-frequency component has been reduced, and outputs the analog signal to the A/D converter A/D 1 of the CPU 21 as a second angular velocity vy.

The third amplifier 28c amplifies the signal representing the first gravitational component output from the acceleration sensor 26c, and outputs the analog signal to the A/D converter A/D 2 of the CPU 21 as a first acceleration ah.

The fourth amplifier 28d amplifies the signal representing the second gravitational component output from the acceleration sensor 26c, and outputs the analog signal to the A/D converter A/D 3 of the CPU 21 as a second acceleration av.

The reduction of the low-frequency component is a two-step process. The primary part of the analog high-pass filtering is performed first by the first and second high-pass filter circuits 27a and 27b, followed by the secondary part of the digital high-pass filtering that is performed by the CPU 21.

The cut-off frequency of the secondary part of the digital high-pass filtering is higher than that of the primary part of the analog high-pass filtering.

In the digital high-pass filtering, the value of a first high-pass filter time constant hx and a second high-pass filter time constant hy can be easily changed.

The supply of electric power to the CPU 21 and each part of the detection unit 25 begins after the PON switch 11a is set to the ON state (i.e. when the main power supply is set to the ON state). The calculation of a hand-shake quantity (the digital displacement angle $Kx_n$ and the second digital displacement angle $Ky_n$) and an inclination angle (the third digital displacement angle $K\theta_n$) begins after the PON switch 11a is set to the ON state.

The CPU 21 converts the first angular velocity vx, which is input to the A/D converter A/D 0, to a first digital angular velocity signal $Vx_n$ (A/D conversion operation). It also calculates a first digital angular velocity $VVx_n$ by reducing the low-frequency component of the first digital angular velocity signal $Vx_n$ (the digital high-pass filtering) because the low-frequency component of the first digital angular velocity signal $Vx_n$ includes signal elements that are based on null voltage and panning motion, neither of which are related to hand shake. It also calculates a hand-shake quantity (a hand-shake displacement angle around the y direction: a first digital displacement angle $Kx_n$ caused by yaw) by integrating the first digital angular velocity $VVx_n$ (the integration).

Similarly, the CPU 21 converts the second angular velocity vy, which is input to the A/D converter A/D 1, to a second digital angular velocity signal $Vy_n$ (A/D conversion operation). It also calculates a second digital angular velocity $VVy_n$ by reducing the low-frequency component of the second digital angular velocity signal $Vy_n$ (the digital high-pass filtering) because the low-frequency component of the second digital angular velocity signal $Vy_n$ includes signal elements that are based on null voltage and panning motion, neither of which are related to hand shake. It also calculates a hand-shake quantity (a hand-shake displacement angle around the x direction: a second digital displacement angle $Ky_n$ caused by pitch) by integrating the second digital angular velocity $VVy_n$ (the integration).

Furthermore, the CPU 21 converts the first acceleration ah, which is input to the A/D converter A/D 2, to a first digital acceleration signal $Dah_n$ (A/D conversion operation). It also calculates a first digital acceleration $Aah_n$ by reducing the high-frequency component of the first digital acceleration signal $Dah_n$ (the digital low-pass filtering) in order to reduce the noise component in the first digital acceleration signal $Dah_n$.

Similarly, the CPU 21 converts the second acceleration av, which is input to the A/D converter A/D 3, to a second digital acceleration signal $Dav_n$ (A/D conversion operation). It also calculates a second digital acceleration $Aav_n$ by reducing the high-frequency component of the second digital acceleration signal $Dav_n$ (the digital low-pass filtering) in order to reduce the noise component in the second digital acceleration signal $Dav_n$.

The CPU 21 also calculates the inclination angle (third digital displacement angle $K\theta_n$) of the photographic apparatus 1, formed by rotation of the photographic apparatus 1 around its optical axis LX, as measured with respect to a level plane perpendicular to the direction of gravitational force, on the basis of the magnitude relation between the absolute value of the first digital acceleration $Aah_n$ and the absolute value of the second digital acceleration $Aav_n$.

The inclination angle (the third digital displacement angle $K\theta_n$) of the photographic apparatus 1 changes according to the orientation of the photographic apparatus 1 and is measured with respect to one of the first horizontal orientation, the second horizontal orientation, the first vertical orientation, and the second vertical orientation. Therefore, the inclination angle of the photographic apparatus 1 is represented by the angle at which the x direction or the y direction intersects a level plane.

When one of the x direction and the y direction intersects a level plane at an angle of 0 degrees, and when the other of the x direction and the y direction intersects a level plane at an angle of 90 degrees, the photographic apparatus 1 is in a non-inclined state.

Thus, the CPU 21 and the detection unit 25 have a function for calculating the hand-shake quantity and the inclination angle.

The first digital acceleration $Aah_n$ (the first gravitational component) and the second digital acceleration $Aav_n$ (the second gravitational component) change according to the orientation of the photographic apparatus 1, and take values from −1 to +1.

For example, when the photographic apparatus 1 is held in the first horizontal orientation, in other words, when the photographic apparatus 1 is held horizontally and the upper surface of the photographic apparatus 1 faces upward (see FIG. 2), the first digital acceleration $Aah_n$ is 0 and the second digital acceleration $Aav_n$ is +1.

When the photographic apparatus 1 is held in the second horizontal orientation, in other words, when the photographic apparatus 1 is held horizontally and the lower surface of the photographic apparatus 1 faces upward (see FIG. 9), the first digital acceleration $Aah_n$ is 0 and the second digital acceleration $Aav_n$ is −1.

When the photographic apparatus 1 is held in the first vertical orientation, in other words, when the photographic apparatus 1 is held vertically and one of the side surfaces of the photographic apparatus 1 faces upward (see FIG. 10), the first digital acceleration $Aah_n$ is +1 and the second digital acceleration $Aav_n$ is 0.

When the photographic apparatus 1 is held in the second vertical orientation, in other words, when the photographic apparatus 1 is held vertically and the other side surface of the photographic apparatus 1 faces upward (see FIG. 11), the first digital acceleration $Aah_n$ is −1 and the second digital acceleration $Aav_n$ is 0.

When the front surface of the photographic apparatus 1 faces the direction of gravitational force or the opposite direction, in other words, when the front surface of the photographic apparatus 1 faces upward or downward, the first digital acceleration $Aah_n$ and the second digital acceleration $Aav_n$ are 0.

Figure 12:
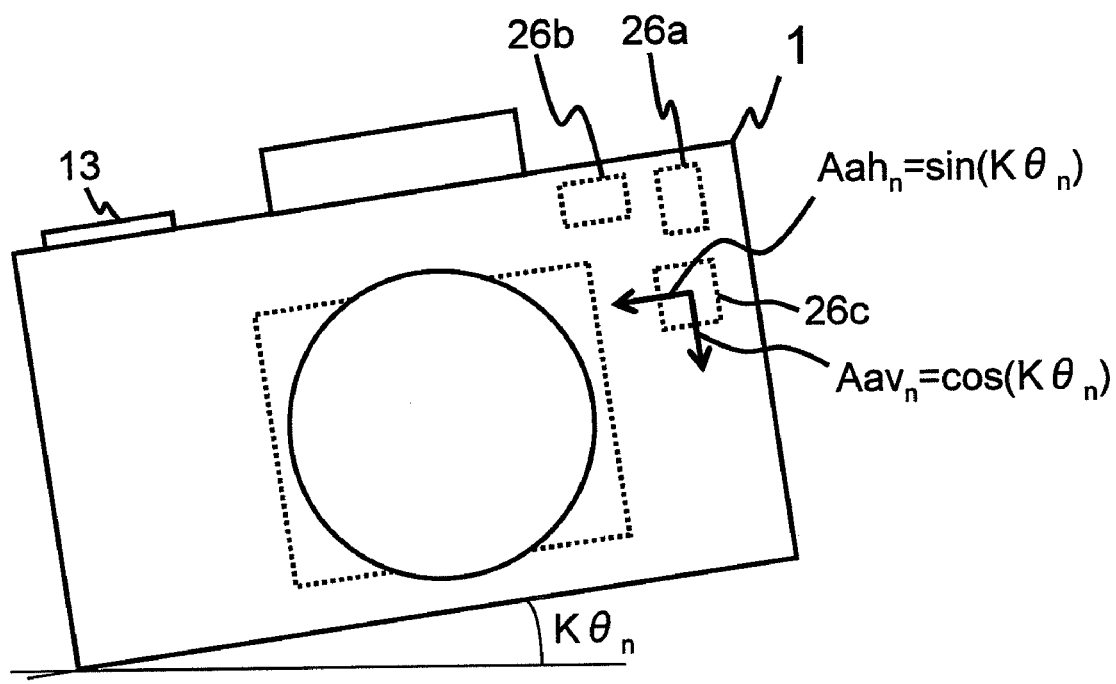
FIG. 12 is a front view of the photographic apparatus, and $K\theta_n$ is the angle formed when the photographic apparatus is rotated (inclined) in a counter-clockwise direction as viewed from the front, away from the first horizontal orientation.

When the photographic apparatus 1 is rotated (inclined) at an angle $K\theta_n$ in a counter-clockwise direction viewed from the front, from the first horizontal orientation (see FIG. 12), the first digital acceleration $Aah_n$ is $+\sin(K\theta_n)$ and the second digital acceleration $Aav_n$ is $+\cos(K\theta_n)$.

Therefore, the inclination angle (the third digital displacement angle $K\theta_n$) can be calculated by performing an arcsine transformation on the first digital acceleration $Aah_n$ or by performing an arccosine transformation on the second digital acceleration $Aav_n$.

Figure 8:
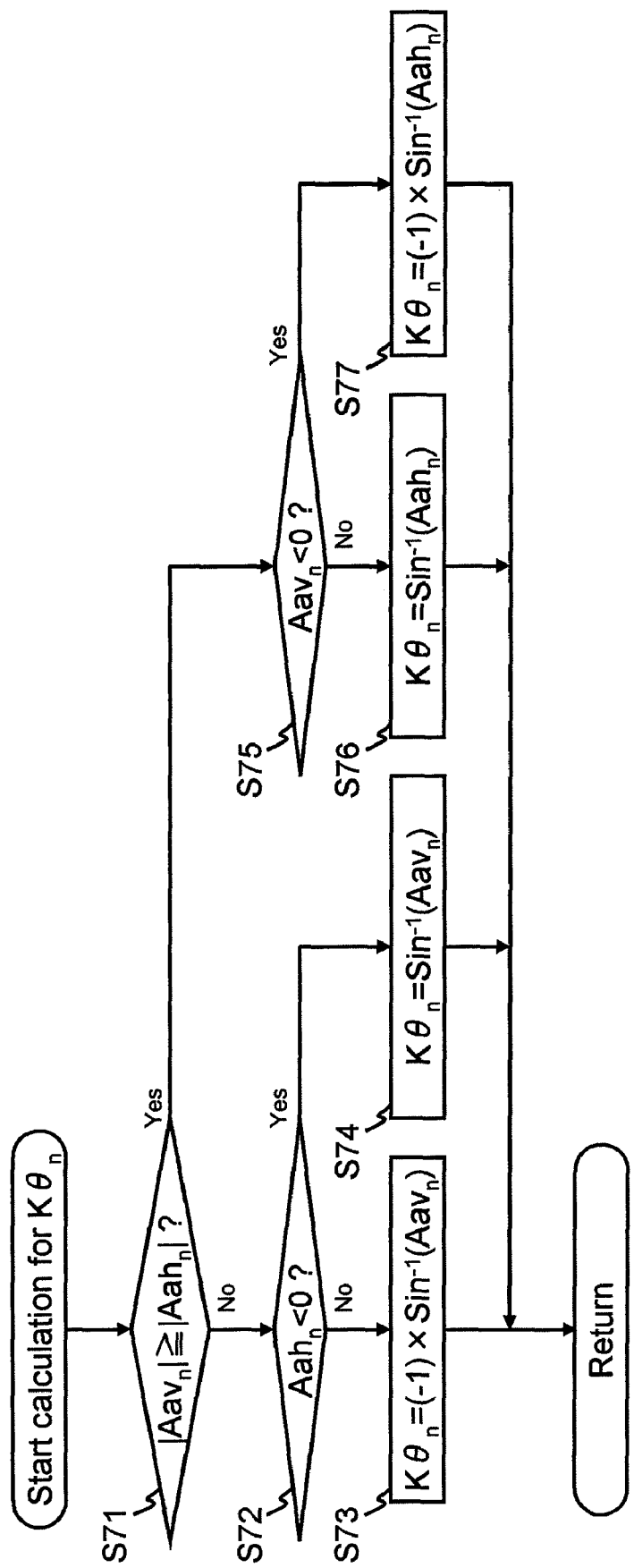
FIG. 8 is a flowchart showing the details of the calculation of the third digital displacement angle.

However, while the absolute value of the inclination angle (the third digital displacement angle $K\theta_n$) is very small, in other words, nearly 0, the variation of the sine function is larger than that of the cosine function so that the inclination angle is best calculated by using the arcsine transformation rather than the arccosine transformation ($K\theta_n = +\sin^{-1}(Aah_n)$, see step S76 in FIG. 8).

Figure 13:
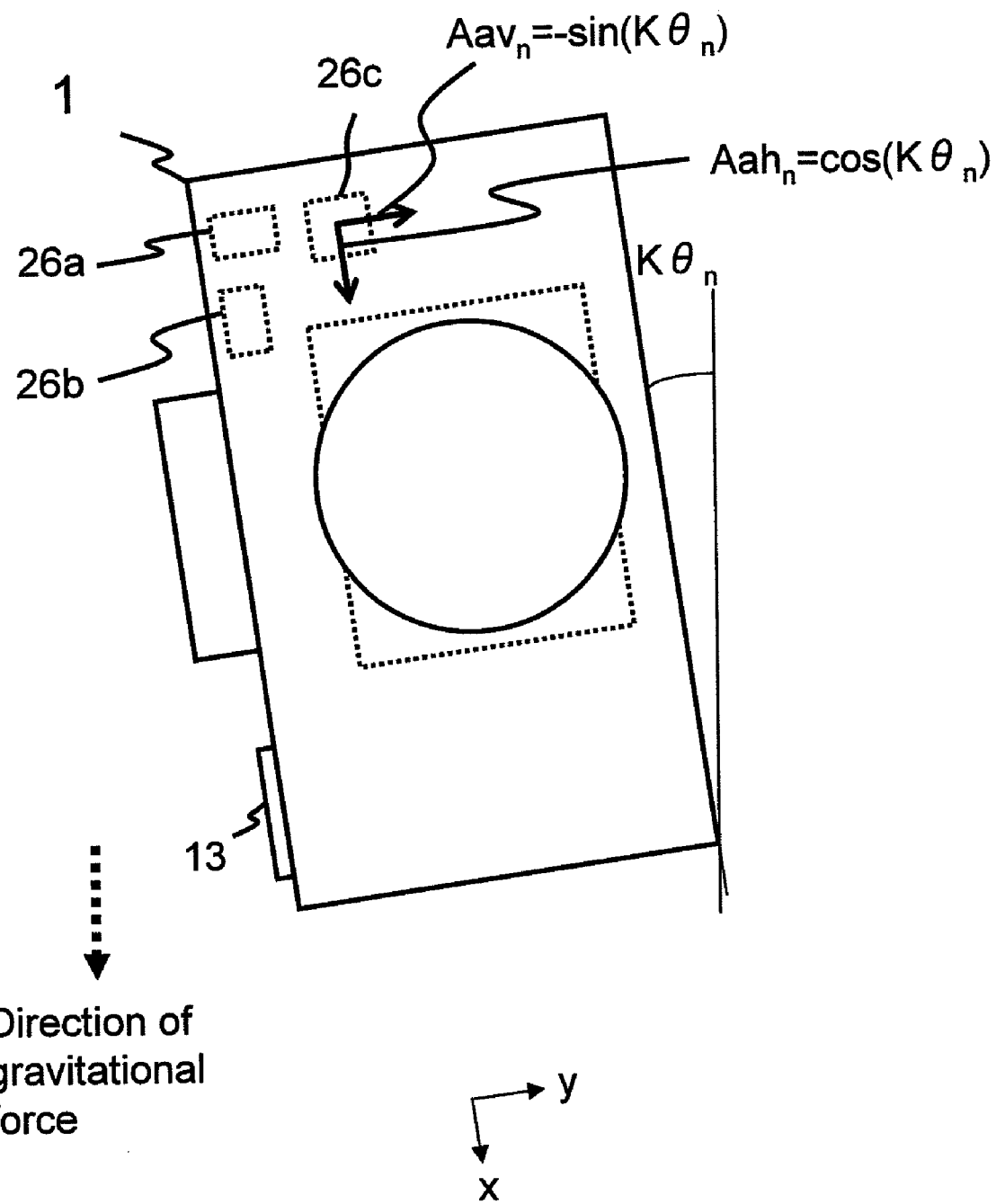
FIG. 13 is a front view of the photographic apparatus, and $K\theta_n$ is the angle formed when the photographic apparatus is rotated (inclined) in a counter-clockwise direction as viewed from the front, away from the first vertical orientation.

When the photographic apparatus 1 is rotated (inclined) at an angle $K\theta_n$ in a counter-clockwise direction viewed from the front, from the first vertical orientation (see FIG. 13), the first digital acceleration $Aah_n$ is $+\cos(K\theta_n)$ and the second digital acceleration $Aav_n$ is $-\sin(K\theta_n)$.

Therefore, the inclination angle (the third digital displacement angle $K\theta_n$) can be calculated by performing an arccosine transformation on the first digital acceleration $Aah_n$ or by performing an arcsine transformation on the second digital acceleration $Aav_n$ and taking the negative.

However, while the absolute value of the inclination angle (the third digital displacement angle $K\theta_n$) is very small, in other words, nearly 0, the variation of the sine function is larger than that of the cosine function so that the inclination angle is best calculated by using the arcsine transformation rather than the arccosine transformation ($K\theta_n = -\sin^{-1}(Aav_n)$, see step S73 in FIG. 8).

Figure 14:
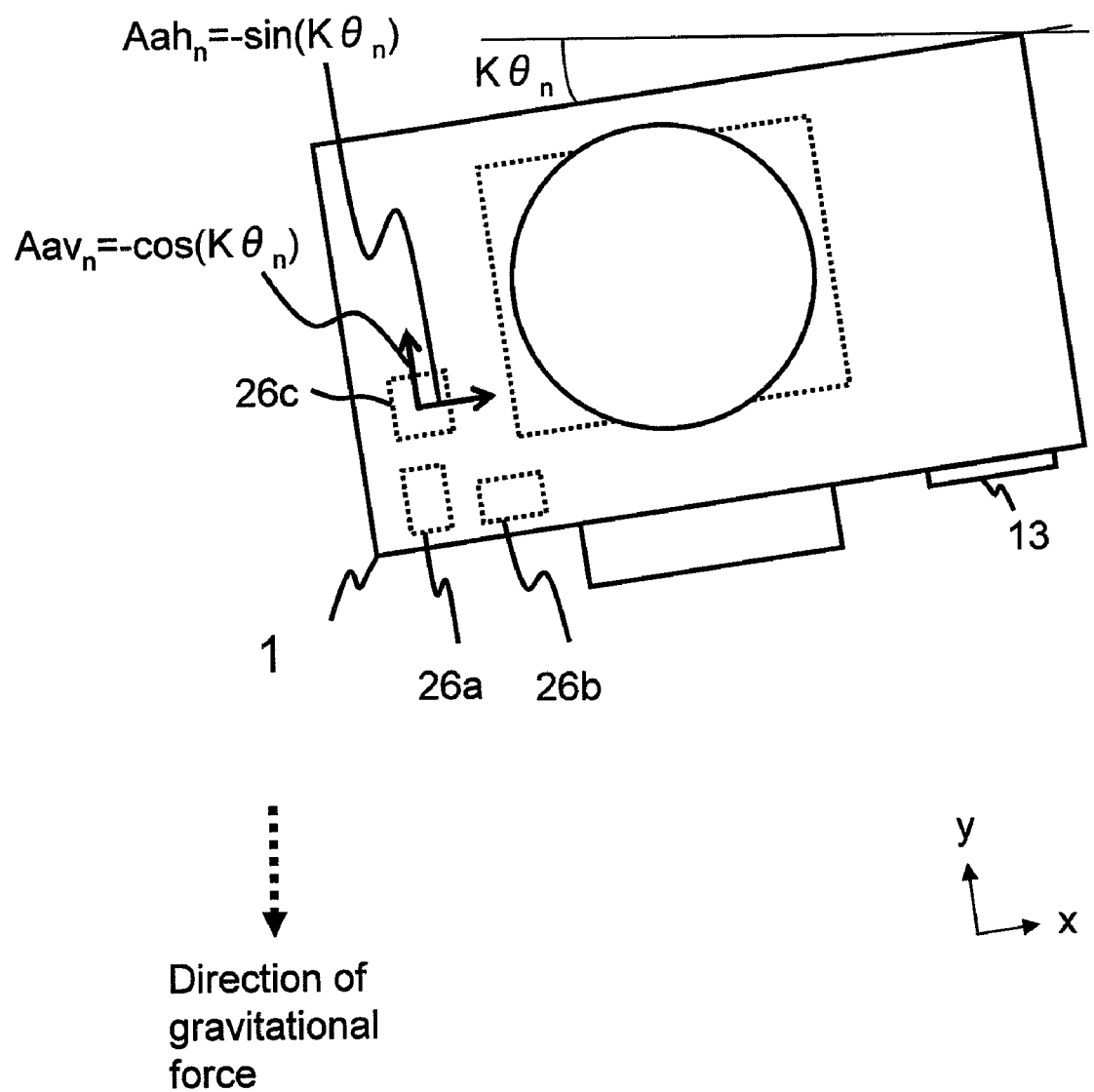
FIG. 14 is a front view of the photographic apparatus, and $K\theta_n$ is the angle formed when the photographic apparatus is rotated (inclined) in a counter-clockwise direction as viewed from the front, away from the second horizontal orientation.

When the photographic apparatus 1 is rotated (inclined) at an angle $K\theta_n$ in a counter-clockwise direction viewed from the front, from the second horizontal orientation (see FIG. 14), the first digital acceleration $Aah_n$ is $-\sin(K\theta_n)$ and the second digital acceleration $Aav_n$ is $-\cos(K\theta_n)$.

Therefore, the inclination angle (the third digital displacement angle $K\theta_n$) can be calculated by performing an arcsine transformation on the first digital acceleration $Aah_n$ and taking the negative or by performing an arccosine transformation on the second digital acceleration $Aav_n$ and taking the negative.

However, while the absolute value of the inclination angle (the third digital displacement angle $K\theta_n$) is very small, in other words, nearly 0, the variation of the sine function is larger than that of the cosine function so that the inclination angle is best calculated by using the arcsine transformation rather than the arccosine transformation ($K\theta_n = -\sin^{-1}(Aah_n)$, see step S77 in FIG. 8).

Figure 15:
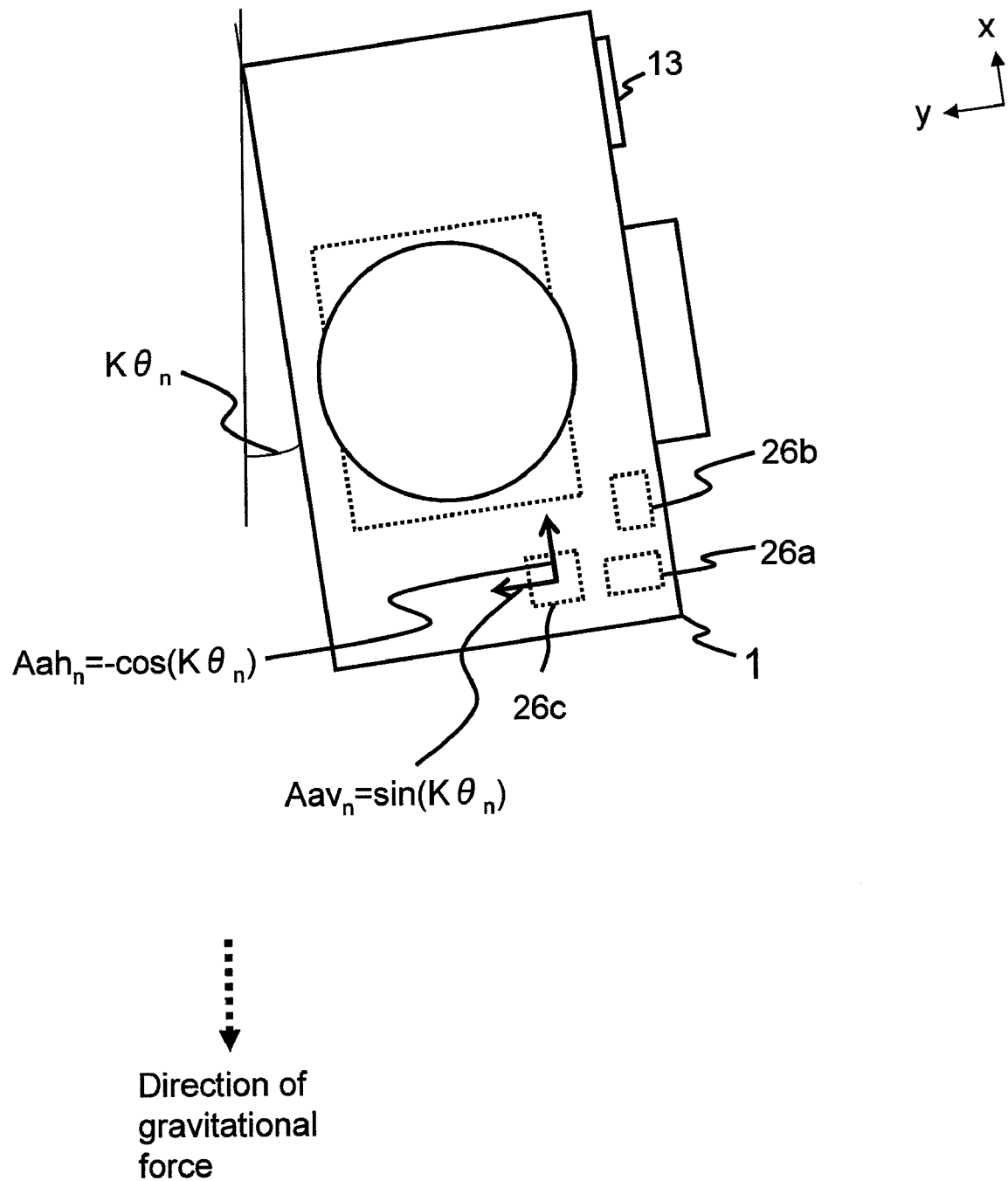
FIG. 15 is a front view of the photographic apparatus, and $K\theta_n$ is the angle formed when the photographic apparatus is rotated (inclined) in a counter-clockwise direction as viewed from the front, away from the second vertical orientation.

When the photographic apparatus 1 is rotated (inclined) at an angle $K\theta_n$ in a counter-clockwise direction viewed from the front, from the second vertical orientation (see FIG. 15), the first digital acceleration $Aah_n$ is $-\cos(K\theta_n)$ and the second digital acceleration $Aav_n$ is $+\sin(K\theta_n)$.

Therefore, the inclination angle (the third digital displacement angle $K\theta_n$) can be calculated by performing an arccosine transformation on the first digital acceleration $Aah_n$ and taking the negative or by performing an arcsine transformation on the second digital acceleration $Aav_n$.

However, while the absolute value of the inclination angle (the third digital displacement angle $K\theta_n$) is very small, in other words, is nearly 0, the variation of the sine function is larger than that of the cosine function so that the inclination angle is best calculated by using the arcsine transformation rather than the arccosine transformation ($K\theta_n=+\mathrm{Sin}^{-1}(Aav_n)$, see step S74 in FIG. 8).

When the front surface of the photographic apparatus 1 faces mostly upward or downward, the first digital acceleration $Aah_n$ and the second digital acceleration $Aav_n$ are nearly 0. In this case, this means that inclination correction, in other words, the rotational movement in accordance with the inclination angle, is not necessary, it is desirable to perform the stabilization and inclination correction, with the inclination angle being minimal.

However, when the arccosine transformation on the first digital acceleration $Aah_n$ or the second digital acceleration $Aav_n$ that is nearly 0 is performed, the absolute value of the inclination angle (the third digital displacement angle $K\theta_n$) is a large value. In this case, the stabilization and inclination correction is performed with the inclination angle being large, even when the rotational movement in accordance with the inclination angle is not necessary. Therefore, the inclination correction cannot be performed correctly.

Therefore, in order to eliminate the inclination angle, it is necessary to determine whether the front surface of the photographic apparatus 1 faces mostly upward or downward by using an additional determination factor.

An example of the additional determination factor is the determination of whether the sum of the absolute value of the first digital acceleration $Aah_n$ and the absolute value of the second digital acceleration $Aav_n$ is less than a threshold value.

On the other hand, when the arcsine transformation on the first digital acceleration $Aah_n$ or the second digital acceleration $Aav_n$ that is nearly 0 is performed, the absolute value of the inclination angle (the third digital displacement angle $K\theta_n$) is a small value (nearly 0). In this case, the stabilization and inclination correction can be performed, with the inclination angle being small. Therefore, it is not necessary to determine whether the front surface of the photographic apparatus 1 faces mostly upward or downward by using the additional determination factor.

The value "n" is an integer greater than or equal to 0, and indicates the duration in milliseconds from the point when the timer interrupt process commences, (t=0, and see step S12 in FIG. 4), to when the last timer interrupt process is performed (t=n).

Figure 6:
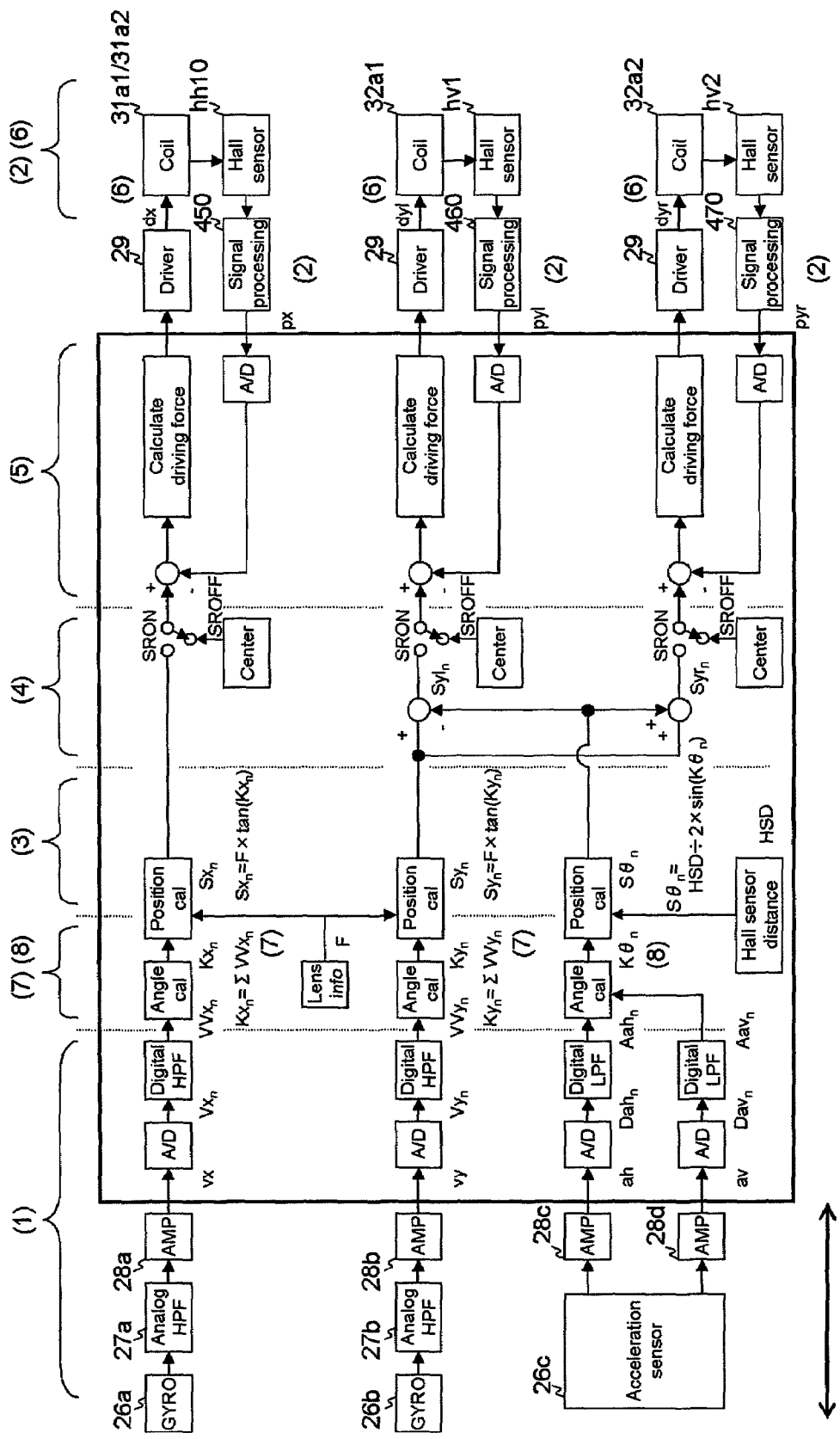
FIG. 6 illustrates the calculations involved in the stabilization and inclination correction.

In the digital high-pass filtering regarding the yaw, the first digital angular velocity $VVx_n$ is calculated by dividing the sum of the first digital angular velocity $VVx_0$ and $VVx_{n-1}$ (calculated by the timer interrupt process before the 1 ms predetermined time interval, before the last timer interrupt process is performed) by the first high-pass filter time constant hx, and then subtracting the resulting quotient from the first digital angular velocity signal $Vx_n$ ($VVx_n=Vx_n-(\Sigma V Vx_{n-1})\div hx$, see (1) in FIG. 6).

In the digital high-pass filtering regarding the pitch, the second digital angular velocity $VVy_n$ is calculated by dividing the sum of the second digital angular velocity $VVy_0$ and $VVy_{n-1}$ (calculated by the timer interrupt process before the 1 ms predetermined time interval, before the last timer interrupt process is performed) by the second high-pass filter time constant hy, and then subtracting the resulting quotient from the second digital angular velocity signal $Vy_n$ ($VVy_n=Vy_n-(\Sigma VVy_{n-1})\div hy$, see (1) in FIG. 6).

In the integration regarding the yaw, the first digital displacement angle $Kx_n$ is calculated by summing the first digital angular velocity $VVx_0$ at the point when the timer interrupt process commences, t=0, (see step S12 in FIG. 4) and the first digital angular velocity $VVx_n$ at the point when the last timer interrupt process is performed (t=n), ($Kx_n=\Sigma VVx_n$, see (7) in FIG. 6).

Similarly, in the integration regarding the pitch, the second digital displacement angle $Ky_n$ is calculated by summing the second digital angular velocity $VVy_0$ at the point when the timer interrupt process commences and the second digital angular velocity $VVy_n$ at the point when the last timer interrupt process is performed ($Ky_n=\Sigma VVy_n$, see (7) in FIG. 6).

The inclination angle, in other words, the third digital displacement angle $K\theta_n$ is calculated by performing the arcsine transformation on the smaller of the absolute value of the first digital acceleration $Aah_n$ and the absolute value of the second digital acceleration $Aav_n$ and by adding a positive or negative sign ($K\theta_n=+\mathrm{Sin}^{-1}(Aah_n)$, $-\mathrm{Sin}^{-1}(Aah_n)$, $+\mathrm{Sin}^{-1}(Aav_n)$, or $-\mathrm{Sin}^{-1}(Aav_n)$, see (8) in FIG. 6).

Whether the positive or negative sign is added is determined on the basis of the larger of the absolute value of the first digital acceleration $Aah_n$ and the absolute value of the second digital acceleration $Aav_n$, and the sign of that larger value without applying the absolute value (see steps S72 and S75 in FIG. 8).

In the embodiment, the angular velocity and acceleration detection operation during the timer interrupt process includes a process in the detection unit 25 and the input of the first angular velocity vx, the second angular velocity vy, the first acceleration ah, and the second acceleration av from the detection unit 25 to the CPU 21.

In the calculation of the third digital displacement angle $K\theta_n$, an integration is not performed because it is unnecessary. Therefore, the DC offset does not affect the calculation of the third digital displacement angle $K\theta_n$, so the inclination angle can be calculated accurately.

When the integration including the DC offset is used, the third digital displacement angle $K\theta_n$ represents an unspecified value even if the inclination angle is 0. Accordingly, the movable platform 30a including the imager 39a1 is rotated (inclined) compared to the initial state in order to correct the third digital displacement angle $K\theta_n$ representing the unspecified value.

Because the displacement of the movable platform 30a in this case means the inclination of the imager 39a1, the captured image displayed on the display 17 is inclined. When the operator sees the inclined image on the display 17, the operator must visually detect the inclination of the displayed image even if the inclination is very small.

However, in the embodiment, because the DC offset does not exist, the inclination of the imager 39a1 caused by the DC offset does not exist.

The CPU 21 calculates the position $S_n$ where the imaging unit 39a (the movable platform 30a) should be moved, in accordance with the hand-shake quantity (the first and second digital displacement angles $Kx_n$ and $Ky_n$) and the inclination angle (the third digital displacement angle $K\theta_n$) calculated for the x direction, the y direction, and the rotational direction, based on the lens coefficient F and the hall sensor distance coefficient HSD ($Sx_n=F\times\tan(Kx_n)$, $Sy_n=F\times\tan(Ky_n)$, and $S\theta_n=HSD\div 2\times\sin(K\theta_n)$). In this calculation, both the translational (linear) movement of the movable platform 30a in the xy plane and the rotational movement of the movable platform 30a in the xy plane are considered.

The horizontal direction component of the position $S_n$ is defined as $Sx_n$, the vertical direction component of the position $S_n$ is defined as $Sy_n$, and the rotational (inclination) direction component of the position $S_n$ is defined as $S\theta_n$.

The rotation of the movable platform 30a is performed by applying different forces in the y direction on a first driving point and a second driving point on the movable platform 30a. The movement of the movable platform 30a in the y direction is performed by applying the same driving forces in the y direction on the first and second driving points on the movable platform 30a. The first driving point is the point to which a first vertical electro-magnetic force based on the first vertical coil 32a1 is applied. The second driving point is the point to which a second vertical electro-magnetic force based on the second vertical coil 32a2 is applied. The first driving point is set to a position close to the first vertical hall sensor hv1. The second driving point is set to a position close to the second vertical hall sensor hv2.

The first vertical direction component of the first driving point corresponding to the position $S_n$ is defined as $Syl_n$. The second vertical direction component of the second driving point corresponding to the position $S_n$ is defined as $Syr_n$.

The first vertical direction component of the first driving point, $Syl_n$, and the second vertical direction component of the second driving point, $Syr_n$, are calculated on the basis of the vertical direction component of the position $S_n$, $Sy_n$, and the rotational direction component of the position $S_n$, $S\theta_n$, ($Syl_n=Sy_n+S\theta_n$, $Syr_n=Sy_n-S\theta_n$, see (4) in FIG. 6).

It is determined whether the calculations of the first digital displacement angle $Kx_n$, the second digital displacement angle $Ky_n$, the third digital displacement angle $K\theta_n$, the horizontal direction component of the position $S_n$, $Sx_n$, the vertical direction component of the position $S_n$, $Sy_n$, the rotational direction component of the position $S_n$, $S\theta_n$, the first vertical direction component of the first driving point, $Syl_n$, and the second vertical direction component of the second driving point, $Syr_n$ are performed, according to the value of the stabilization parameter SR and the value of the inclination parameter INC.

The movement of the movable platform 30a, which includes the imaging unit 39a, is performed by using an electro-magnetic force and is described later.

The driving force $D_n$ is for driving the driver circuit 29 in order to move the movable platform 30a to the position $S_n$.

The horizontal direction component of the driving force $D_n$ for the first and second horizontal coils 31a1 and 31a2 is defined as the horizontal driving force $Dx_n$ (after D/A conversion, the horizontal PWM duty dx).

The vertical direction component of the driving force $D_n$ for the first vertical coil 32a1 is defined as the first vertical driving force $Dyl_n$ (after D/A conversion, the first vertical PWM duty dyl).

The vertical direction component of the driving force $D_n$ for the second vertical coil 32a2 is defined as the second vertical driving force $Dyr_n$ (after D/A conversion, the second vertical PWM duty dyr).

The correction unit 30 is an apparatus that corrects for the effects of hand shake by moving the imaging unit 39a to the position $S_n$, by canceling the lag of the subject image on the imaging surface of the imager 39a1 of the imaging unit 39a, and by stabilizing the subject image displayed on the imaging surface of the imager 39a1.

The correction unit 30 has a fixed unit 30b and a movable platform 30a that includes the imaging unit 39a and can be moved in the xy plane.

By moving the movable platform 30a in the x direction, the first stabilization for correcting the hand shake caused by yaw is performed; and by moving the movable platform 30a in the y direction, the second stabilization for correcting the hand shake caused by pitch is performed (the translational movement).

Moreover, the correction unit 30 performs the inclination correction (the rotational movement) that corrects (reduces) the inclination of the photographic apparatus 1 formed by rotation of the photographic apparatus 1 around its optical axis LX, as measured with respect to a level plane perpendicular to the direction of gravitational force, by rotating the movable platform 30a including the imaging unit 39a around an axis parallel to the optical axis LX.

In other words, in the inclination correction, the movement control repositions the movable platform 30a so that the upper and lower sides of the rectangle composing the outline of the imaging surface of the imager 39a1 are perpendicular to the direction of gravitational force and the left and right sides are parallel to the direction of gravitational force.

Therefore, the imager 39a1 can be automatically leveled without using a level vial. When the photographic apparatus 1 images a subject including the horizon, the imaging operation can be performed, with the upper and lower sides of the rectangle composing the outline of the imaging surface of the imager 39a1 being parallel to the horizon.

Moreover, due to the inclination correction, the upper and lower sides of the rectangle composing the outline of the imaging surface of the imager 39a1 are kept perpendicular to the direction of gravitational force, and the left and right sides of the rectangle composing the outline of the imaging surface of the imager 39a1 are kept parallel to the direction of gravitational force. Therefore, hand shake caused by roll is also corrected by the inclination correction. In other words, rotating the movable platform 30a in the xy plane for the inclination correction also achieves stabilization for correcting the hand shake caused by roll.

When the stabilization and inclination correction is performed, in other words, when the stabilization parameter SR is set to 1 and the inclination correction parameter INC is set to 1 (SR=1, and INC=1), the movement control including the rotational movement of the movable platform 30a for the stabilization and inclination correction is performed.

Figure 5:
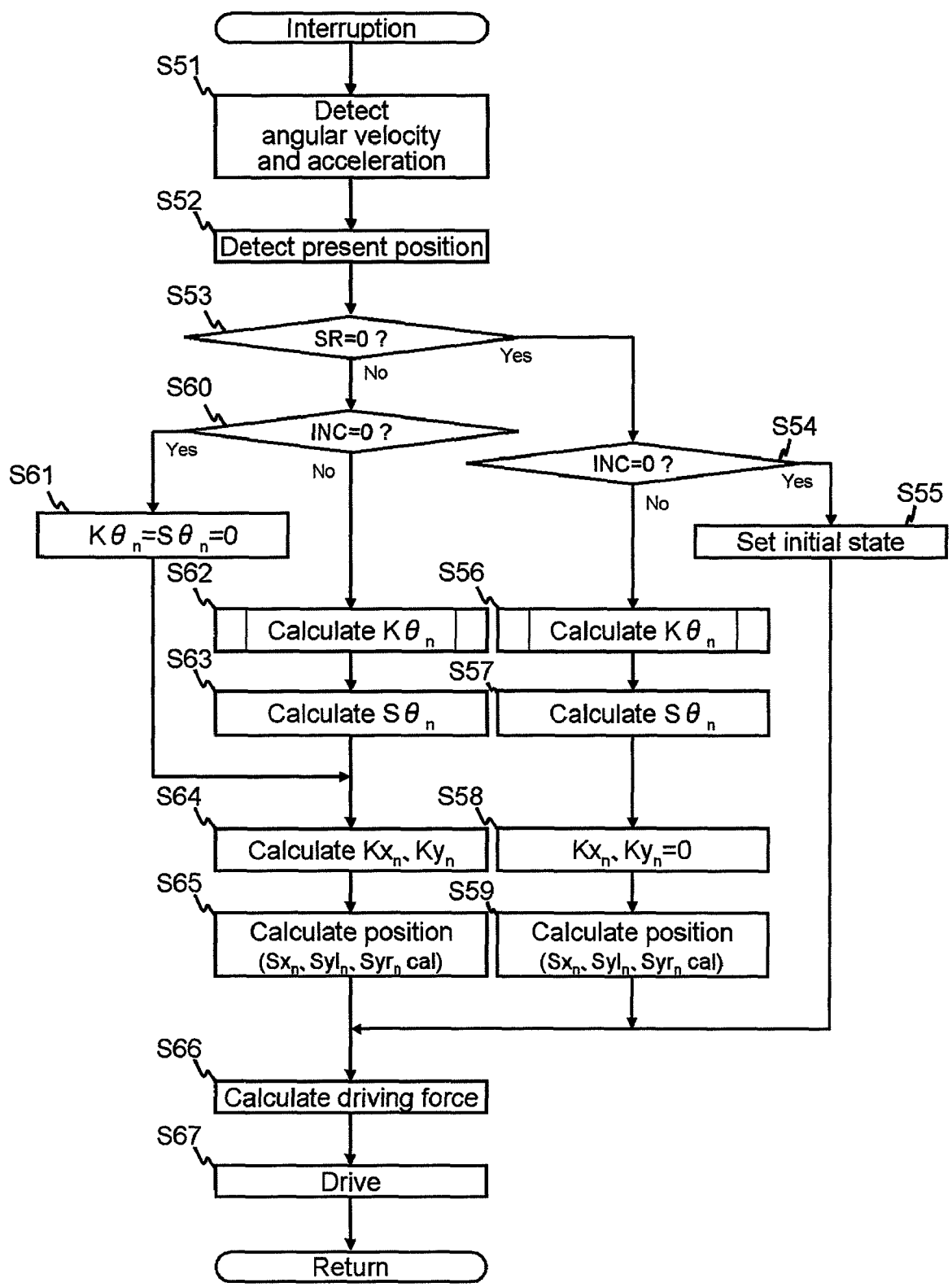
FIG. 5 is a flowchart that shows the details of the timer interrupt process.

In this case, the calculations of the first digital displacement angle $Kx_n$, the second digital displacement angle $Ky_n$, the third digital displacement angle $K\theta_n$, the horizontal direction component of the position $S_n$, $Sx_n$, the vertical direction component of the position $S_n$, $Sy_n$, the rotational direction component of the position $S_n$, $S\theta_n$, the first vertical direction component of the first driving point, $Syl_n$, and the second vertical direction component of the second driving point, $Syr_n$ are performed (see steps S62 to S65 of FIG. 5).

When the stabilization is not performed but the inclination correction is performed, in other words, when the stabilization parameter SR is set to 0 and the inclination correction parameter INC is set to 1 (SR=0, and INC=1), the rotational movement control of the movable platform 30a for the inclination correction is performed, provided that the movement control of the movable platform 30a in the x direction and in the y direction from the predetermined position is not performed. In the embodiment, the predetermined position is the center of its movement range in both the x direction and the y direction.

In this case, the first digital displacement angle $Kx_n$ and the second digital displacement angle $Ky_n$ are set to 0 provided that the hand shake caused by yaw and the hand shake caused by pitch do not occur ($Kx_n=Ky_n=0$).

On the basis of these values of the first digital displacement angle $Kx_n$ and the second digital displacement angle $Ky_n$, the calculations of the third digital displacement angle $K\theta_n$, the horizontal direction component of the position $S_n$, $Sx_n$, the vertical direction component of the position $S_n$, $Sy_n$, the rotational direction component of the position $S_n$, $S\theta_n$, the first vertical direction component of the first driving point, $Syl_n$, and the second vertical direction component of the second driving point, $Syr_n$ are performed (see steps S56 to S59 of FIG. 5, $Sx_n=Sy_n=0$).

When the stabilization is performed but the inclination correction is not performed, in other words, when the stabilization parameter SR is set to 1 and the inclination correction parameter INC is set to 0 (SR=1, and INC=0), the movement control of the movable platform 30a in the x direction and in the y direction for the stabilization is performed, provided that the rotational movement control of the movable platform 30a is not performed.

In this case, the third digital displacement angle $K\theta_n$ is set to 0 provided that the inclination does not occur ($K\theta_n=0$).

On the basis of this value of the third digital displacement angle $K\theta_n$, the calculations of the first digital displacement angle $Kx_n$, the second digital displacement angle $Ky_n$, the horizontal direction component of the position $S_n$, $Sx_n$, the vertical direction component of the position $S_n$, $Sy_n$, the rotational direction component of the position $S_n$, $S\theta_n$, the first vertical direction component of the first driving point, $Syl_n$, and the second vertical direction component of the second driving point, $Syr_n$ are performed (see steps S61, S64, and S65 of FIG. 5, $S\theta_n=0$).

When the stabilization and inclination correction is not performed, in other words, when the stabilization parameter SR is set to 0 and the inclination correction parameter INC is set to 0 (SR=0, and INC=0), the position $S_n$ ($Sx_n$, $Syl_n$, $Syr_n$) where the movable platform 30a should be moved is set to the initial state (see step S55 in FIG. 5, $Sx_n=Syl_n=Syr_n=0$).

Driving of the movable platform 30a, including movement to the fixed (held) position of the initial state, is performed by the electro-magnetic force of the coil unit and the magnetic unit through the driver circuit 29, which has the horizontal PWM duty dx input from the PWM 0 of the CPU 21, the first vertical PWM duty dyl input from the PWM 1 of the CPU 21, and the second vertical PWM duty dyr input from the PWM 2 of the CPU 21 (see (6) in FIG. 6).

The detected-position $P_n$ of the movable platform 30a, either before or after the movement effected by the driver circuit 29, is detected by the hall sensor unit 44a and the hall-sensor signal-processing unit 45.

Information regarding the horizontal direction component of the detected-position $P_n$, in other words, the horizontal detected-position signal px, is input to the A/D converter A/D 4 of the CPU 21 (see (2) in FIG. 6). The horizontal detected-position signal px is an analog signal that is converted to a digital signal by the A/D converter A/D 4 (A/D conversion operation). The horizontal direction component of the detected-position $P_n$ after the A/D conversion operation, is defined as $pdx_n$ and corresponds to the horizontal detected-position signal px.

Information regarding one of the vertical direction components of the detected-position $P_n$, in other words, the first vertical detected-position signal pyl, is input to the A/D converter A/D 5 of the CPU 21. The first vertical detected-position signal pyl is an analog signal that is converted to a digital signal by the A/D converter A/D 5 (A/D conversion operation). The first vertical direction component of the detected-position $P_n$ after the A/D conversion operation is defined as $pdyl_n$ and corresponds to the first vertical detected-position signal pyl.

Information regarding the other of the vertical direction components of the detected-position $P_n$, in other words, the second vertical detected-position signal pyr, is input to the A/D converter A/D 6 of the CPU 21. The second vertical detected-position signal pyr is an analog signal that is con- verted to a digital signal by the A/D converter A/D 6 (A/D conversion operation). The second vertical direction component of the detected-position $P_n$ after the A/D conversion operation is defined as $pdyr_n$ and corresponds to the second vertical detected-position signal pyr.

The PID (Proportional Integral Differential) control calculates the horizontal driving force $Dx_n$ and the first and second vertical driving forces $Dyl_n$ and $Dyr_n$ on the basis of the coordinate data for the detected-position $P_n$ ($pdx_n$, $pdyl_n$, $pdyr_n$) and the position $S_n$ ($Sx_n$, $Syl_n$, $Syr_n$) following movement (see (5) in FIG. 6).

Driving of the movable platform 30a to the position $S_n$, ($Sx_n$, $Syl_n$, $Syr_n$) corresponding to the stabilization and inclination correction of the PID control, is performed when the photographic apparatus 1 is in the stabilization mode (SR=1) where the stabilization switch 14a is set to the ON state, or when the photographic apparatus 1 is in the inclination correction mode (INC=1) where the first inclination correction switch 15a is set to the ON state.

When the stabilization parameter SR is 0 and the inclination correction parameter INC is 0, PID control unrelated to the stabilization and inclination correction is performed so that the movable platform 30a is moved to the predetermined position (the center of the movement range) at the initial state such that each of the four sides composing the outline of the imaging surface of the imager 39a1 of the imaging unit 39a is parallel to either the x direction or the y direction, in other words, such that the movable platform 30a is not rotated (inclined).

Figure 7:
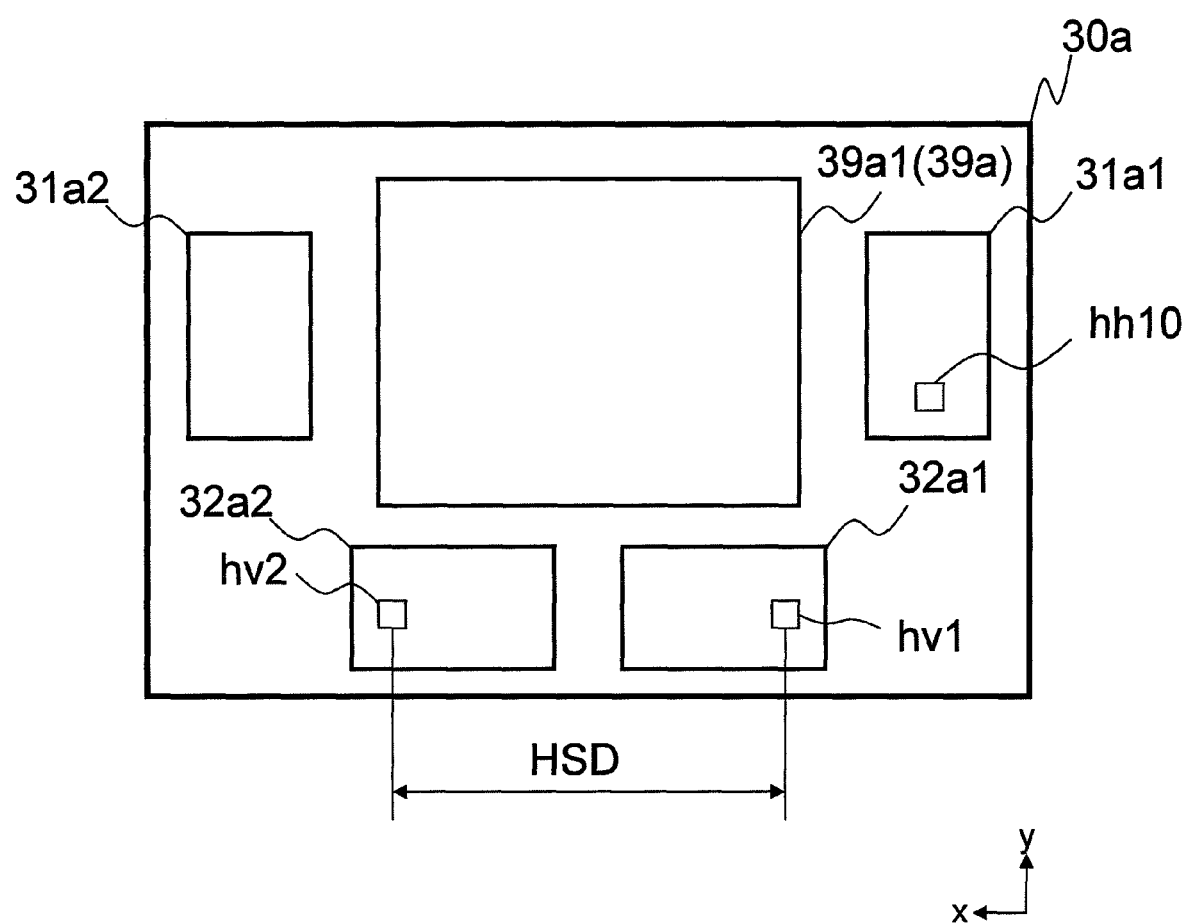
FIG. 7 is a construction diagram of the movable platform.

The movable platform 30a has a coil unit for driving that is comprised of a first horizontal coil 31a1, a second horizontal coil 31a2, a first vertical coil 32a1, and a second vertical coil 32a2, an imaging unit 39a having the imager 39a1, and a hall sensor unit 44a as a magnetic-field change-detecting element unit (see FIG. 7). In the embodiment, the imager 39a1 is a CCD; however, the imager 39a1 may be of another type, such as a CMOS, etc.

The fixed unit 30b has a magnetic position detection and driving unit that is comprised of a first horizontal magnet 411b1, a second horizontal magnet 411b2, a first vertical magnet 412b1, a second vertical magnet 412b2, a first horizontal yoke 431b1, a second horizontal yoke 431b2, a first vertical yoke 432b1, and a second vertical yoke 432b2.

The fixed unit 30b movably and rotatably supports the movable platform 30a in the movement range in the xy plane, using balls, etc. The balls are arranged between the fixed unit 30b and the movable platform 30a.

When the central area of the imager 39a1 is intersecting the optical axis LX of the camera lens 67, the relationship between the position of the movable platform 30a and the position of the fixed unit 30b is arranged so that the movable platform 30a is positioned at the center of its movement range in both the x direction and the y direction, in order to utilize the full size of the imaging range of the imager 39a1.

The rectangular form of the imaging surface of the imager 39a1 has two diagonal lines. In the embodiment, the center of the imager 39a1 is at the intersection of these two diagonal lines.

Furthermore, the movable platform 30a is positioned at the center of its movement range in both the x direction and the y direction, and each of the four sides composing the outline of the imaging surface of the imager 39a1 is parallel to either the x direction or the y direction, in the initial state immediately after the PON switch 11a is set to the ON state (see step S11 of FIG. 4). Then, the stabilization and inclination correction commences.

The first horizontal coil 31*a*1, the second horizontal coil 31*a*2, the first vertical coil 32*a*1, the second vertical coil 32*a*2, and the hall sensor unit 44*a* are attached to the movable platform 30*a*.

The first horizontal coil 31*a*1 forms a seat and a spiral-shaped coil pattern. The coil pattern of the first horizontal coil 31*a*1 has lines which are parallel to the y direction, thus creating the first horizontal electro-magnetic force to move the movable platform 30*a* that includes the first horizontal coil 31*a*1, in the x direction.

The first horizontal electro-magnetic force is created by the current direction of the first horizontal coil 31*a*1 and the magnetic-field direction of the first horizontal magnet 411*b*1.

The second horizontal coil 31*a*2 forms a seat and a spiral-shaped coil pattern. The coil pattern of the second horizontal coil 31*a*2 has lines which are parallel to the y direction, thus creating the second horizontal electro-magnetic force to move the movable platform 30*a* that includes the second horizontal coil 31*a*2, in the x direction.

The second horizontal electro-magnetic force is created by the current direction of the second horizontal coil 31*a*2 and the magnetic-field direction of the second horizontal magnet 411*b*2.

The first vertical coil 32*a*1 forms a seat and a spiral-shaped coil pattern. The coil pattern of the first vertical coil 32*a*1 has lines which are parallel to the x direction, thus creating the first vertical electro-magnetic force to move the movable platform 30*a* that includes the first vertical coil 32*a*1, in the y direction and to rotate the movable platform 30*a*.

The first vertical electro-magnetic force is created by the current direction of the first vertical coil 32*a*1 and the magnetic-field direction of the first vertical magnet 412*b*1.

The second vertical coil 32*a*2 forms a seat and a spiral-shaped coil pattern. The coil pattern of the second vertical coil 32*a*2 has lines which are parallel to the x direction, thus creating the second vertical electro-magnetic force to move the movable platform 30*a* that includes the second vertical coil 32*a*2, in the y direction and to rotate the movable platform 30*a*.

The second vertical electro-magnetic force is created by the current direction of the second vertical coil 32*a*2 and the magnetic-field direction of the second vertical magnet 412*b*2.

The first and second horizontal coils 31*a*1 and 31*a*2 and the first and second vertical coils 32*a*1 and 32*a*2 are connected to the driver circuit 29, which drives the first and second horizontal coils 31*a*1 and 31*a*2 and the first and second vertical coils 32*a*1 and 32*a*2, through the flexible circuit board (not depicted).

The horizontal PWM duty dx, that is a duty ratio of a PWM pulse, is input to the driver circuit 29 from the PWM 0 of the CPU 21. The first vertical PWM duty dyl, that is a duty ratio of a PWM pulse, is input to the driver circuit 29 from the PWM 1 of the CPU 21. The second vertical PWM duty dyr, that is a duty ratio of a PWM pulse, is input to the driver circuit 29 from the PWM 2 of the CPU 21.

The driver circuit 29 supplies the same power to the first and second horizontal coils 31*a*1 and 31*a*2, corresponding to the value of the horizontal PWM duty dx, to move the movable platform 30*a* in the x direction.

The driver circuit 29 supplies power to the first vertical coil 32*a*1 corresponding to the value of the first vertical PWM duty dyl and to the second vertical coil 32*a*2 corresponding to the value of the second vertical PWM duty dyr, in order to move the movable platform 30*a* in the y direction and to rotate the movable platform 30*a*.

The positional relationship between the first and second horizontal coils 31*a*1 and 31*a*2 is determined so that the optical axis LX is located between the first and second horizontal coils 31*a*1 and 31*a*2 in the x direction, in the initial state. In other words, the first and second horizontal coils 31*a*1 and 31*a*2 are arranged in a symmetrical arrangement centered on the optical axis LX, in the x direction in the initial state.

The first and second vertical coils 32*a*1 and 32*a*2 are arranged in the x direction in the initial state.

The first and second horizontal coils 31*a*1 and 31*a*2 are arranged such that the distance between the central area of the imager 39*a*1 and the central area of the first horizontal coil 31*a*1 in the x direction is the same as the distance between the center of the imager 39*a*1 and the central area of the second horizontal coil 31*a*2 in the x direction.

The first and second vertical coils 32*a*1 and 32*a*2 are arranged such that in the initial state, the distance between the central area of the imager 39*a*1 and the central area of the first vertical coil 32*a*1 in the y direction is the same as the distance between the center of the imager 39*a*1 and the central area of the second vertical coil 32*a*2 in the y direction.

The first horizontal magnet 411*b*1 is attached to the movable platform side of the fixed unit 30*b*, where the first horizontal magnet 411*b*1 faces the first horizontal coil 31*a*1 and the horizontal hall sensor hh10 in the z direction.

The second horizontal magnet 411*b*2 is attached to the movable platform side of the fixed unit 30*b*, where the second horizontal magnet 411*b*2 faces the second horizontal coil 31*a*2 in the z direction.

The first vertical magnet 412*b*1 is attached to the movable platform side of the fixed unit 30*b*, where the first vertical magnet 412*b*1 faces the first vertical coil 32*a*1 and the first vertical hall sensor hv1 in the z direction.

The second vertical magnet 412*b*2 is attached to the movable platform side of the fixed unit 30*b*, where the second vertical magnet 412*b*2 faces the second vertical coil 32*a*2 and the second vertical hall sensor hv2 in the z direction.

The first horizontal magnet 411*b*1 is attached to the first horizontal yoke 431*b*1, such that the N pole and S pole are arranged in the x direction. The first horizontal yoke 431*b*1 is attached to the fixed unit 30*b*.

Likewise, the second horizontal magnet 411*b*2 is attached to the second horizontal yoke 431*b*2, such that the N pole and S pole are arranged in the x direction. The second horizontal yoke 431*b*2 is attached to the fixed unit 30*b*.

The first vertical magnet 412*b*1 is attached to the first vertical yoke 432*b*1, such that the N pole and S pole are arranged in the y direction. The first vertical yoke 432*b*1 is attached to the fixed unit 30*b*.

Likewise, the second vertical magnet 412*b*2 is attached to the second vertical yoke 432*b*2, such that the N pole and S pole are arranged in the y direction. The second vertical yoke 432*b*2 is attached to the fixed unit 30*b*.

The first and second horizontal yokes 431*b*1 and 431*b*2 are made of a soft magnetic material.

The first horizontal yoke 431*b*1 prevents the magnetic field of the first horizontal magnet 411*b*1 from dissipating to the surroundings, and raises the magnetic-flux density between the first horizontal magnet 411*b*1 and the first horizontal coil 31*a*1, and between the first horizontal magnet 411*b*1 and the horizontal hall sensor hh10.

Similarly, the second horizontal yoke 431*b*2 prevents the magnetic field of the second horizontal magnet 411*b*2 from dissipating to the surroundings, and raises the magnetic-flux density between the second horizontal magnet 411*b*2 and the second horizontal coil 31*a*2.

The first and second vertical yokes 432*b*1 and 432*b*2 are made of a soft magnetic material.

The first vertical yoke 432b1 prevents the magnetic field of the first vertical magnet 412b1 from dissipating to the surroundings, and raises the magnetic-flux density between the first vertical magnet 412b1 and the first vertical coil 32a1, and between the first vertical magnet 412b1 and the first vertical hall sensor hv1.

Likewise, the second vertical yoke 432b2 prevents the magnetic field of the second vertical magnet 412b2 from dissipating to the surroundings, and raises the magnetic-flux density between the second vertical magnet 412b2 and the second vertical coil 32a2, and between the second vertical magnet 412b2 and the second vertical hall sensor hv2.

The first and second horizontal yokes 431b1 and 431b2 and the first and second vertical yokes 432b1 and 432b2 may be composed of one body or separate bodies.

The hall sensor unit 44a is a one-axis hall sensor with three component hall sensors that are electromagnetic converting elements (magnetic-field change-detecting elements) using the Hall Effect. The hall sensor unit 44a detects the horizontal detected-position signal px, the first vertical detected-position signal pyl, and the second vertical detected-position signal pyr.

One of the three hall sensors is a horizontal hall sensor hh10 for detecting the horizontal detected-position signal px, and another of the three hall sensors is a first vertical hall sensor hv1 for detecting the first vertical detected-position signal pyl, with the third being a second vertical hall sensor hv2 for detecting the second vertical detected-position signal pyr.

The horizontal hall sensor hh10 is attached to the movable platform 30a, where the horizontal hall sensor hh10 faces the first horizontal magnet 411b1 of the fixed unit 30b in the z direction.

The horizontal hall sensor hh10 may be arranged outside the spiral winding of the first horizontal coil 31a1 in the y direction. However, it is desirable for the horizontal hall sensor hh10 to be arranged inside the spiral winding of the first horizontal coil 31a1, and midway along the outer circumference of the spiral winding of the first horizontal coil 31a1 in the x direction (see FIG. 7).

The horizontal hall sensor hh10 is layered on the first horizontal coil 31a1 in the z direction. Accordingly, the area in which the magnetic field is generated for the position-detecting operation and the area in which the magnetic field is generated for driving the movable platform 30a are shared. Therefore, the length of the first horizontal magnet 411b1 in the y direction and the length of the first horizontal yoke 431b1 in the y direction can be shortened.

The first vertical hall sensor hv1 is attached to the movable platform 30a, where the first vertical hall sensor hv1 faces the first vertical magnet 412b1 of the fixed unit 30b in the z direction.

The second vertical hall sensor hv2 is attached to the movable platform 30a, where the second vertical hall sensor hv2 faces the second vertical magnet 412b2 of the fixed unit 30b in the z direction.

The first and second vertical hall sensors hv1 and hv2 are arranged in the x direction in the initial state.

The first vertical hall sensor hv1 may be arranged outside the spiral winding of the first vertical coil 32a1 in the x direction. However, it is desirable for the first vertical hall sensor hv1 to be arranged inside the spiral winding of the first vertical coil 32a1, and midway along the outer circumference of the spiral winding of the first vertical coil 32a1 in the y direction.

The first vertical hall sensor hv1 is layered on the first vertical coil 32a1 in the z direction. Accordingly, the area in which the magnetic field is generated for the position-detecting operation and the area in which the magnetic field is generated for driving the movable platform 30a are shared. Therefore, the length of the first vertical magnet 412b1 in the x direction and the length of the first vertical yoke 432b1 in the x direction can be shortened.

The second vertical hall sensor hv2 may be arranged outside the spiral winding of the second vertical coil 32a2 in the x direction. However, it is desirable for the second vertical hall sensor hv2 to be arranged inside the spiral winding of the second vertical coil 32a2, and midway along the outer circumference of the spiral winding of the second vertical coil 32a2 in the y direction.

The second vertical hall sensor hv2 is layered on the second vertical coil 32a2 in the z direction. Accordingly, the area in which the magnetic field is generated for the position-detecting operation and the area in which the magnetic field is generated for driving the movable platform 30a are shared. Therefore, the length of the second vertical magnet 412b2 in the x direction and the length of the second vertical yoke 432b2 in the x direction can be shortened.

Furthermore, the first driving point to which the first vertical electro-magnetic force based on the first vertical coil 32a1 is applied can be close to a position-detecting point by the first vertical hall sensor hv1, and the second driving point to which the second vertical electro-magnetic force based on the second vertical coil 32a2 is applied can be close to a position-detecting point by the second vertical hall sensor hv2. Therefore, accurate driving control of the movable platform 30a can be performed.

In the initial state, it is desirable for the horizontal hall sensor hh10 to be located at a place on the hall sensor unit 44a that faces an intermediate area between the N pole and S pole of the first horizontal magnet 411b1 in the x direction, as viewed from the z direction, to perform the position-detecting operation utilizing the full range within which an accurate position-detecting operation can be performed based on the linear output change (linearity) of the one-axis hall sensor.

Similarly, in the initial state, it is desirable for the first vertical hall sensor hv1 to be located at a place on the hall sensor unit 44a that faces an intermediate area between the N pole and S pole of the first vertical magnet 412b1 in the y direction, as viewed from the z direction.

Likewise, in the initial state, it is desirable for the second vertical hall sensor hv2 to be located at a place on the hall sensor unit 44a that faces an intermediate area between the N pole and S pole of the second vertical magnet 412b2 in the y direction, as viewed from the z direction.

The first hall-sensor signal-processing unit 45 has a signal processing circuit of the magnetic-field change-detecting element that is comprised of a first hall-sensor signal-processing circuit 450, a second hall-sensor signal-processing circuit 460, and a third hall-sensor signal-processing circuit 470.

The first hall-sensor signal-processing circuit 450 detects a horizontal potential difference between the output terminals of the horizontal hall sensor hh10, based on the output signal of the horizontal hall sensor hh10.

The first hall-sensor signal-processing circuit 450 outputs the horizontal detected-position signal px to the A/D converter A/D 4 of the CPU 21, on the basis of the horizontal potential difference. The horizontal detected-position signal px represents the location of the part of the movable platform 30a which has the horizontal hall sensor hh10, in the x direction.

The first hall-sensor signal-processing circuit 450 is connected to the horizontal hall sensor hh10 through the flexible circuit board (not depicted).

The second hall-sensor signal-processing circuit 460 detects a first vertical potential difference between the output terminals of the first vertical hall sensor hv1, based on the output signal of the first vertical hall sensor hv1.

The second hall-sensor signal-processing circuit 460 outputs the first vertical detected-position signal pyl to the A/D converter A/D 5 of the CPU 21, on the basis of the first vertical potential difference. The first vertical detected-position signal pyl represents the location of the part of the movable platform 30a which has the first vertical hall sensor hv1 (the position-detecting point by the first vertical hall sensor hv1), in the y direction.

The second hall-sensor signal-processing circuit 460 is connected to the first vertical hall sensor hv1 through the flexible circuit board (not depicted).

The third hall-sensor signal-processing circuit 470 detects a second vertical potential difference between the output terminals of the second vertical hall sensor hv2, based on the output signal of the second vertical hall sensor hv2.

The third hall-sensor signal-processing circuit 470 outputs the second vertical detected-position signal pyr to the A/D converter A/D 6 of the CPU 21, on the basis of the second vertical potential difference. The second vertical detected-position signal pyr represents the location of the part of the movable platform 30a which has the second vertical hall sensor hv2 (the position-detecting point by the second vertical hall sensor hv2), in the y direction.

The third hall-sensor signal-processing circuit 470 is connected to the second vertical hall sensor hv2 through the flexible circuit board (not depicted).

In the embodiment, the three hall sensors (hh10, hv1 and hv2) are used for specifying the location of the movable platform 30a including the rotational (inclination) angle.

The locations in the y direction of the two points on the movable platform 30a are determined by using two of the three hall sensors (hv1 and hv2). The location in the x direction of the one point on the movable platform 30a is determined by using another of the three hall sensors (hh10). The location of the movable platform 30a, which includes the rotational (inclination) angle in the xy plane, can be determined on the basis of the information regarding the locations in the x direction of the one point and the location in the y direction of the two points.

Next, the main operation of the photographic apparatus 1 in the embodiment is explained using the flowchart of FIG. 4.

When the PON switch 11a is set to the ON state, the electrical power is supplied to the detection unit 25 so that the detection unit 25 is set to the ON state in step S11, as the initial state. In the initial state, the movable platform 30a is positioned at the center of its movement range in both the x direction and the y direction, and each of the four sides of the rectangle composing the outline of the imaging surface of the imager 39a1 is parallel to either the x direction or the y direction. Furthermore, the lens information including the lens coefficient F is communicated from the camera lens 67 to the CPU 21.

In step S12, the timer interrupt process at the predetermined time interval (1 ms) commences. In step S13, the value of the release-state parameter RP is set to 0. The details of the timer interrupt process in the embodiment are explained later using the flowchart of FIG. 5.

In step S14, it is determined whether the photometric switch 12a is set to the ON state. When it is determined that the photometric switch 12a is not set to the ON state, the operation returns to step S14 and the process in step S14 is repeated. Otherwise, the operation continues on to step S15.

In step S15, it is determined whether the stabilization switch 14a is set to the ON state. When it is determined that the stabilization switch 14a is not set to the ON state, the value of the stabilization parameter SR is set to 0 in step S16. Otherwise, the value of the stabilization parameter SR is set to 1 in step S17.

In step S18, it is determined whether the first inclination correction switch 15a is set to the ON state. When it is determined that the inclination correction switch 15a is not set to the ON state, the value of the inclination correction parameter INC is set to 0 in step S19. Otherwise, the value of the inclination correction parameter INC is set to 1 in step S20.

When the photometric switch 12a is set to the ON state, the AE sensor of the AE unit 23 is driven, the photometric operation is performed, and the aperture value and the duration of the exposure operation are calculated, in step S21.

In step S22, the AF sensor and the lens control circuit of the AF unit 24 are driven to perform the AF sensing and focus operations, respectively.

In step S23, it is determined whether the shutter release switch 13a is set to the ON state. When the shutter release switch 13a is not set to the ON state, the operation returns to step S14 and the process in steps S14 to S22 is repeated. Otherwise, the operation continues on to step S24.

In step S24, the value of the release-state parameter RP is set to 1, and then the release-sequence operation commences.

In step S25, the value of the mirror state parameter MP is set to 1.

In step S26, the mirror-up operation and the aperture closing operation corresponding to the aperture value that is either preset or calculated, are performed by the mirror-aperture-shutter unit 18.

After the mirror-up operation is finished, the value of the mirror state parameter MP is set to 0, in step S27. In step S28, the opening operation of the shutter (the movement of the front curtain of the shutter) commences.

In step S29, the exposure operation, that is, the electric charge accumulation of the imager 39a1 (CCD etc.), is performed. After the exposure time has elapsed, the closing operation of the shutter (the movement of the rear curtain in the shutter), the mirror-down operation, and the opening operation of the aperture are performed by the mirror-aperture-shutter unit 18, in step S30.

In step S31, the value of the release-state parameter RP is set to 0 so that the photometric switch 12a and the shutter release switch 13a are set to the OFF state and the release-sequence operation is finished. In step S32, the electric charge accumulated in the imager 39a1 during the exposure time is read. In step S33, the CPU 21 communicates with the DSP 19 so that the image-processing operation is performed based on the electric charge read from the imager 39a1. The image on which the image-processing operation is performed is stored in the memory of the photographic apparatus 1. In step S34, the image stored in the memory is displayed on the display 17, and the operation then returns to step S14. In other words, the photographic apparatus 1 is returned to a state in which the next imaging operation can be performed.

Next, the timer interrupt process in the embodiment, which commences in step S12 in FIG. 4 and is performed at every predetermined time interval (1 ms) independent of the other operations, is explained using the flowchart of FIG. 5.

When the timer interrupt process commences, the first angular velocity vx, which is output from the detection unit 25, is input to the A/D converter A/D 0 of the CPU 21 and converted to the first digital angular velocity signal $Vx_n$, in step S51. The second angular velocity vy, which is also output from the detection unit 25, is input to the A/D converter A/D 1 of the CPU 21 and converted to the second digital angular velocity signal $Vy_n$ (the angular velocity detection operation).

Furthermore, the first acceleration ah, which is also output from the detection unit 25, is input to the A/D converter A/D 2 of the CPU 21 and converted to the first digital acceleration signal $Dah_n$. Similarly, the second acceleration av, which is also output from the detection unit 25, is input to the A/D converter A/D 3 of the CPU 21 and converted to the second digital acceleration signal $Dav_n$ (the acceleration detection operation).

The low frequencies of the first and second digital angular velocity signals $Vx_n$ and $Vy_n$ are reduced in the digital high-pass filtering (the first and second digital angular velocities $VVx_n$ and $VVy_n$, see (1) in FIG. 6).

The high frequencies of the first and second digital acceleration signals $Dah_n$ and $Dav_n$ are reduced in the digital low-pass filtering (the first and second digital acceleration $Aah_n$ and $Aav_n$, see (1) in FIG. 6).

In step S52, the hall sensor unit 44a detects the position of the movable platform 30a. The horizontal detected-position signal px and the first and second vertical detected-position signals pyl and pyr are calculated by the hall-sensor signal-processing unit 45. The horizontal detected-position signal px is then input to the A/D converter A/D 4 of the CPU 21 and converted to the digital signal $pdx_n$, the first vertical detected-position signal pyl is then input to the A/D converter A/D 5 of the CPU 21 and converted to the digital signal $pdyl_n$, and the second vertical detected-position signal pyr is input to the A/D converter A/D 6 of the CPU 21 and also converted to the digital signal $pdyr_n$, both of which thus specify the present position $P_n$ ($pdx_n$, $pdyl_n$, $pdyr_n$) of the movable platform 30a (see (2) in FIG. 6).

In step S53, it is determined whether the value of the stabilization parameter SR is 0. When it is determined that the value of the stabilization parameter SR is 0 (SR=0), in other words, that the photographic apparatus 1 is not in the stabilization mode, the operation continues on to step S54. When it is determined that the value of the stabilization parameter SR is 1 (SR=1), in other words, that the photographic apparatus 1 is in the stabilization mode, the operation proceeds to step S60.

In step S54, it is determined whether the value of the inclination correction parameter INC is 0. When it is determined that the value of the inclination correction parameter INC is 0 (INC=0), in other words, that the photographic apparatus 1 is not in the inclination correction mode, the position $S_n$ ($Sx_n$, $Syl_n$, $Syr_n$) where the movable platform 30a should be moved, is set to the initial state ($Sx_n=Syl_n=Syr_n=0$) in step S55 (see (4) in FIG. 6).

When it is determined that the value of the inclination correction parameter INC is not 0 (INC=1), in other words when the photographic apparatus 1 is in inclination correction mode, the third digital displacement angle $K\theta_n$ is calculated on the basis of the first and second digital accelerations $Aah_n$ and $Aav_n$, in step S56 (see (8) in FIG. 6).

In step S57, the rotational (inclination) direction component of the position $S_n$, $S\theta_n$, is calculated on the basis of the third digital displacement angle $K\theta_n$ and the hall sensor distance coefficient HSD (see (3) in FIG. 6).

The details of the calculation of the third digital displacement angle $K\theta_n$ in the embodiment are explained later using the flowchart of FIG. 8.

In step S58, the first digital displacement angle $Kx_n$ and the second digital displacement angle $Ky_n$ are set to 0 provided that the hand shake caused by yaw and the hand shake caused by pitch do not occur ($Kx_n=Ky_n=0$).

In step S59, the horizontal direction component of the position $S_n$, $Sx_n$, and the vertical direction component of the position $S_n$, $Sy_n$, are calculated on the basis of the first digital displacement angle $Kx_n$, the second digital displacement angle $Ky_n$, and the lens coefficient F ($Sx_n=Sy_n=0$, see (3) in FIG. 6).

Then, the first vertical direction component of the first driving point $Syl_n$ and the second vertical direction component of the second driving point $Syr_n$ are calculated on the basis of the vertical direction component of the position $S_n$, $Sy_n$, and the rotational (inclination) direction component of the position $S_n$, $S\theta_n$ (see (4) in FIG. 6).

In step S60, it is determined whether the value of the inclination correction parameter INC is 0.

When it is determined that the value of the inclination correction parameter INC is 0 (INC=0), in other words, that the photographic apparatus 1 is not in the inclination correction mode, the third digital displacement angle $K\theta_n$ and the rotational (inclination) direction component of the position $S_n$, $S\theta_n$, are set to 0 provided that the inclination does not occur ($K\theta_n=S\theta_n=0$) in step S61. And then, the operation proceeds to step S64.

When it is determined that the value of the inclination correction parameter INC is not 0 (INC=1), in other words when the photographic apparatus 1 is in inclination correction mode, the operation proceeds to step S62.

In step S62, the third digital displacement angle $K\theta_n$ is calculated on the basis of the first and second digital accelerations $Aah_n$ and $Aav_n$ (see (8) in FIG. 6).

In step S63, the rotational (inclination) direction component of the position $S_n$, $S\theta_n$, is calculated on the basis of the third digital displacement angle $K\theta_n$ and the hall sensor distance coefficient HSD (see (3) in FIG. 6).

The details of the calculation of the third digital displacement angle $K\theta_n$ in the embodiment are explained later using the flowchart of FIG. 8.

In step S64, the first and second digital displacement angles $Kx_n$ and $Ky_n$ are calculated on the basis of the first and second digital angular velocities $VVx_n$ and $VVy_n$ (see (7) in FIG. 6).

In step S65, the horizontal direction component of the position $S_n$, $Sx_n$, and the vertical direction component of the position $S_n$, $Sy_n$, are calculated on the basis of the first digital displacement angle $Kx_n$, the second digital displacement angle $Ky_n$, and the lens coefficient F (see (3) in FIG. 6).

Then, the first vertical direction component of the first driving point $Syl_n$ and the second vertical direction component of the second driving point $Syr_n$ are calculated on the basis of the vertical direction component of the position $S_n$, $Sy_n$, and the rotational (inclination) direction component of the position $S_n$, $S\theta_n$ (see (4) in FIG. 6).

In step S66, the horizontal driving force $Dx_n$ (the horizontal PWM duty dx), the first vertical driving force $Dyl_n$ (the first vertical PWM duty dyl), and the second vertical driving force $Dyr_n$ (the second vertical PWM duty dyr) of the driving force $D_n$, which moves the movable platform 30a to the position $S_n$, are calculated on the basis of the position $S_n$ ($Sx_n$, $Sy_n$, $S\theta_n$) that was determined in step S55, S59 or S65, and the present position $P_n$ ($pdx_n$, $pdyl_n$, $pdyr_n$) (see (5) in FIG. 6).

In step S67, the first and second horizontal coils 31a1 and 31a2 are driven by applying the horizontal PWM duty dx to the driver circuit 29; the first vertical coil 32a1 is driven by applying the first vertical PWM duty dyl to the driver circuit 29; and the second vertical coil 32a2 is driven by applying the second vertical PWM duty dyr to the driver circuit 29, so that the movable platform 30a is moved to position $S_n$ ($Sx_n$, $Sy_n$, $S\theta_n$) (see (6) in FIG. 6).

The process of steps S66 and S67 is an automatic control calculation that is performed by the PID automatic control for performing general (normal) proportional, integral, and differential calculations.

Next, the calculation of the third digital displacement angle $K\theta_n$, which is performed in steps S55 and S62 in FIG. 5, is explained using the flowchart of FIG. 8.

When the calculation of the third digital displacement angle $K\theta_n$ commences, it is determined whether the absolute value of the second digital acceleration $Aav_n$ is larger than or equal to the absolute value of the first digital acceleration $Aah_n$, in step S71.

When it is determined that the absolute value of the second digital acceleration $Aav_n$ is larger than or equal to the absolute value of the first digital acceleration $Aah_n$, the operation proceeds to step S75, otherwise, the operation continues to step S72.

In step S72, it is determined whether the first digital acceleration $Aah_n$ is less than 0. When it is determined that the first digital acceleration $Aah_n$ is less than 0, the operation proceeds to step S74, otherwise, the operation continues to step S73.

In step S73, the CPU 21 determines that the photographic apparatus 1 is held approximately in the first vertical orientation, and calculates the inclination angle (the third digital displacement angle $K\theta_n$) by performing the arcsine transformation on the second digital acceleration $Aav_n$ and taking the negative ($K\theta_n = -\text{Sin}^{-1}(Aav_n)$).

In step S74, the CPU 21 determines that the photographic apparatus is held approximately in the second vertical orientation, and calculates the inclination angle (the third digital displacement angle $K\theta_n$) by performing the arcsine transformation on the second digital acceleration $Aav_n$ ($K\theta_n = +\text{Sin}^{-1}(Aav_n)$).

In step S75, it is determined whether the second digital acceleration $Aav_n$ is less than 0. When it is determined that the second digital acceleration $Aav_n$ is less than 0, the operation proceeds to step S77, otherwise, the operation continues to step S76.

In step S76, the CPU 21 determines that the photographic apparatus 1 is held approximately in the first horizontal orientation, and calculates the inclination angle (the third digital displacement angle $K\theta_n$) by performing the arcsine transformation on the first digital acceleration $Aah_n$ ($K\theta_n = +\text{Sin}^{-1}(Aah_n)$).

In step S77, the CPU 21 determines that the photographic apparatus is held approximately in the second horizontal orientation, and calculates the inclination angle (the third digital displacement angle $K\theta_n$) by performing the arcsine transformation on the first digital acceleration $Aah_n$ and taking the negative ($K\theta_n = -\text{Sin}^{-1}(Aah_n)$).

Furthermore, it is explained that the hall sensor is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable platform can be obtained by detecting the magnetic-field change, similar to using the hall sensor.

Furthermore, depending on the ON state of the translational movement switch (the stabilization switch 14a), the translational movement including the first stabilization and the second stabilization is performed, and depending on the ON state of the rotational movement switch (the first inclination correction switch 15a), the rotational movement that is the inclination correction is performed, in the embodiment.

However, instead of the inclination correction, a third stabilization for correcting the hand shake caused by roll may be performed as the rotational movement.

In this case, the hand-shake angle caused by roll that corresponds to the third digital displacement angle $K\theta_n$ can be calculated by the acceleration sensor 26c, however, it could be calculated by another sensor such as an angular velocity sensor, etc.

Furthermore, in the embodiment, the position of the first inclination correction button 15 is not limited, so the arrangement of the first inclination correction button 15 on the rear surface of the photographic apparatus 1, is for example. Thus, a second inclination correction button 16 may be arranged on the lower surface of the photographic apparatus 1.

Figure 16:
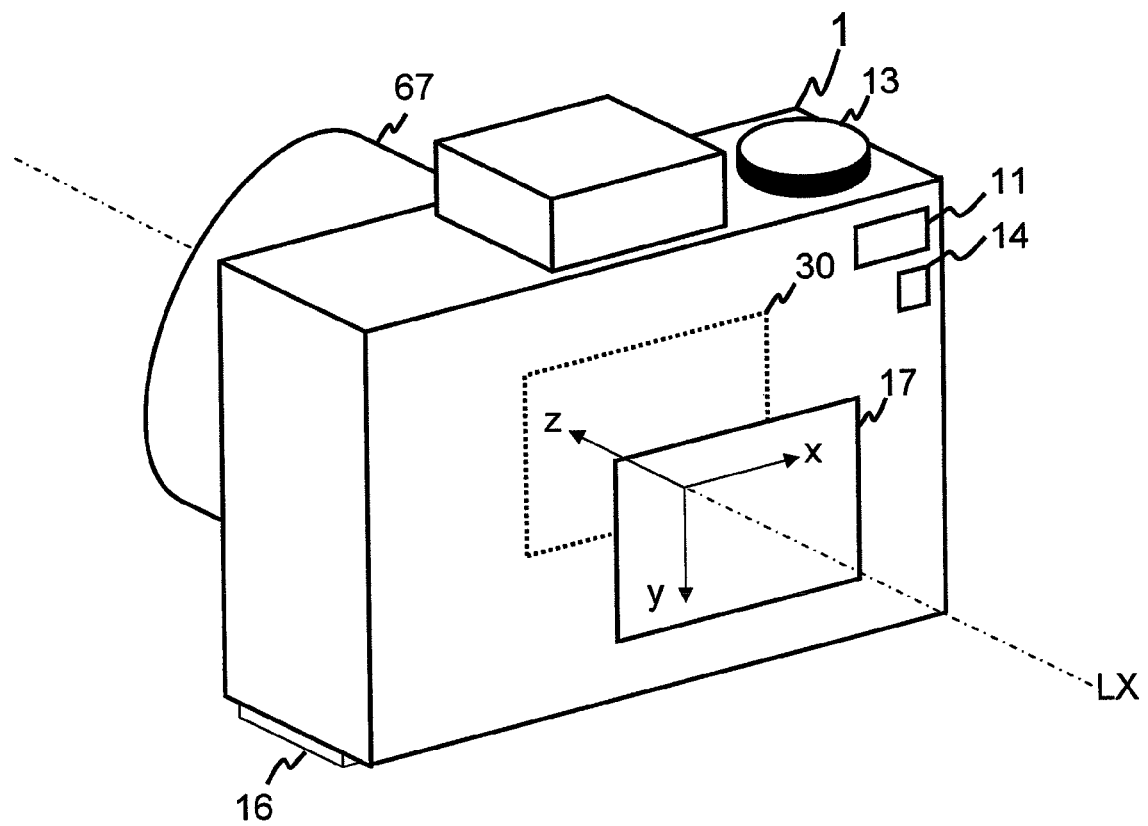
FIG. 16 is a perspective view of the embodiment of the photographic apparatus viewed from the rear, with the second inclination correction button on the lower surface.
Figure 17:
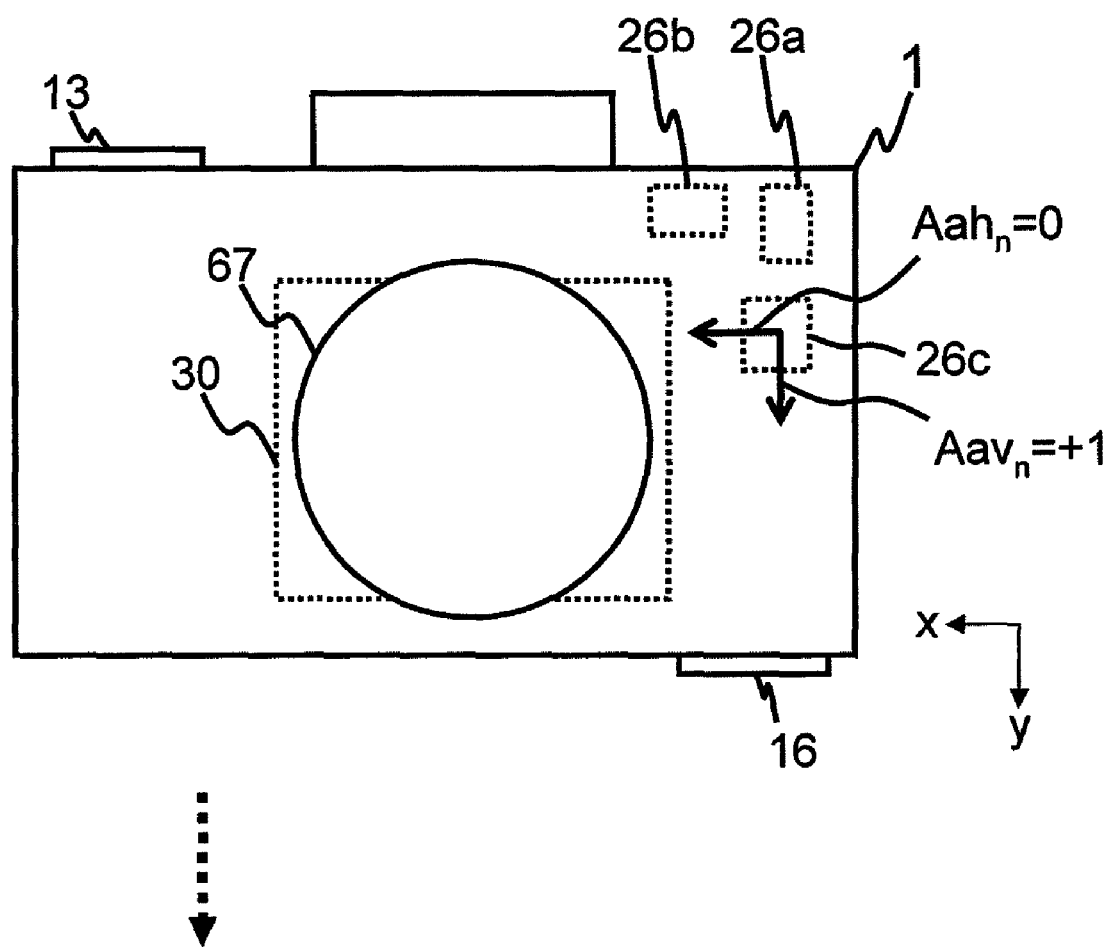
FIG. 17 is a front view of the photographic apparatus, when the photographic apparatus is held in the first horizontal orientation, with the second inclination correction button on the lower surface.
Figure 18:
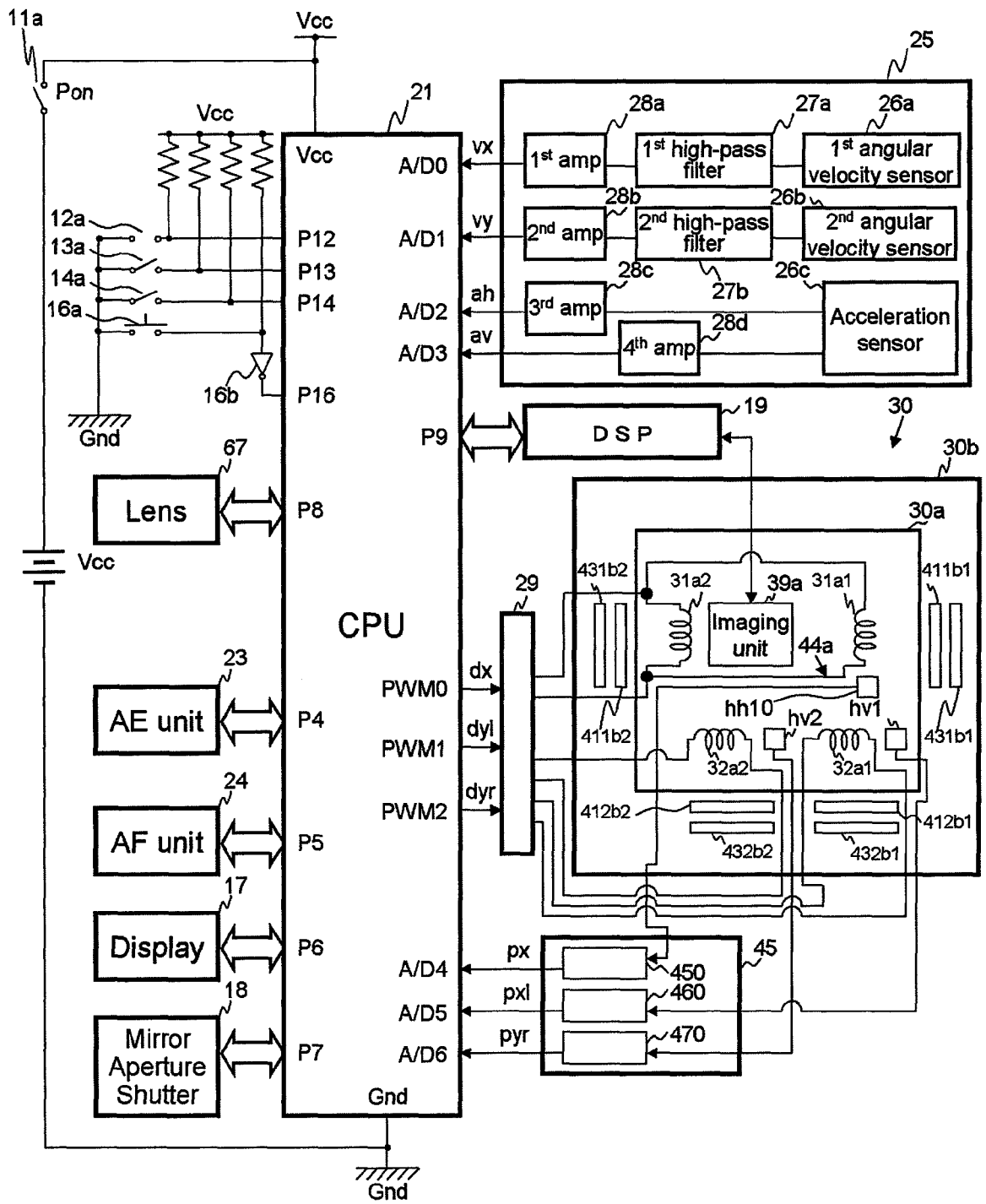
FIG. 18 is a circuit construction diagram of the photographic apparatus, with the second inclination correction button.

Specifically, the second inclination correction button 16 is arranged on the lower surface of the photographic apparatus 1 such that the second inclination correction button 16 is kept away from the shutter release button 13 and the optical axis LX is arranged between the second inclination correction button 16 and the shutter release button 13 (see FIGS. 16 to 18).

Thus, the ON/OFF control of the inclination correction can be operated by the left hand when the left hand holding the photographic apparatus 1.

In this case, instead of the first inclination correction switch 15a and port P15 of the CPU 21, a second inclination correction switch 16a, an inverter 16b, and port P16 of the CPU may be used.

The second inclination correction switch 16a is the auto regression type switch that is set to the ON state only while the second inclination correction button 16 is depressed (or slid), and that is set to the OFF state when the depression (slide) of the second inclination correction button 16 is cancelled.

The inverter 16b outputs the Lo signal to port P16 of the CPU 21 in accordance with the OFF state of the second inclination correction switch 16a, and outputs the Hi signal to port P16 of the CPU 21 in accordance with the ON state of the second inclination correction switch 16a.

When the Hi signal is input to the port P16 of the CPU 21, the value of the inclination correction parameter INC is set to 0. When the Lo signal is input to the port P16 of the CPU 21, the value of the inclination correction parameter INC is set to 1.

In other words, while the second inclination correction button 16 is depressed (or slid) so that the second inclination correction switch 16a is set to the ON state, the inclination correction is suspended or prohibited. While the second inclination correction button 16 is not depressed (or not slid) so that the second inclination correction switch 16a is set to the OFF state, the inclination correction is performed.

Both the depression of the second inclination correction button 16 and the cancellation of the depression of the second inclination correction button 16 are easy to operate for the operator when the photographic apparatus 1 is being held.

Therefore, by the simple operation of depressing the second inclination correction button 16, the inclination correction can be prevented, when the operator wishes to shoot in an inclined orientation.

Otherwise, the inclination correction can be restarted by simple operation of releasing the second inclination correction button 16.

Figure 19:
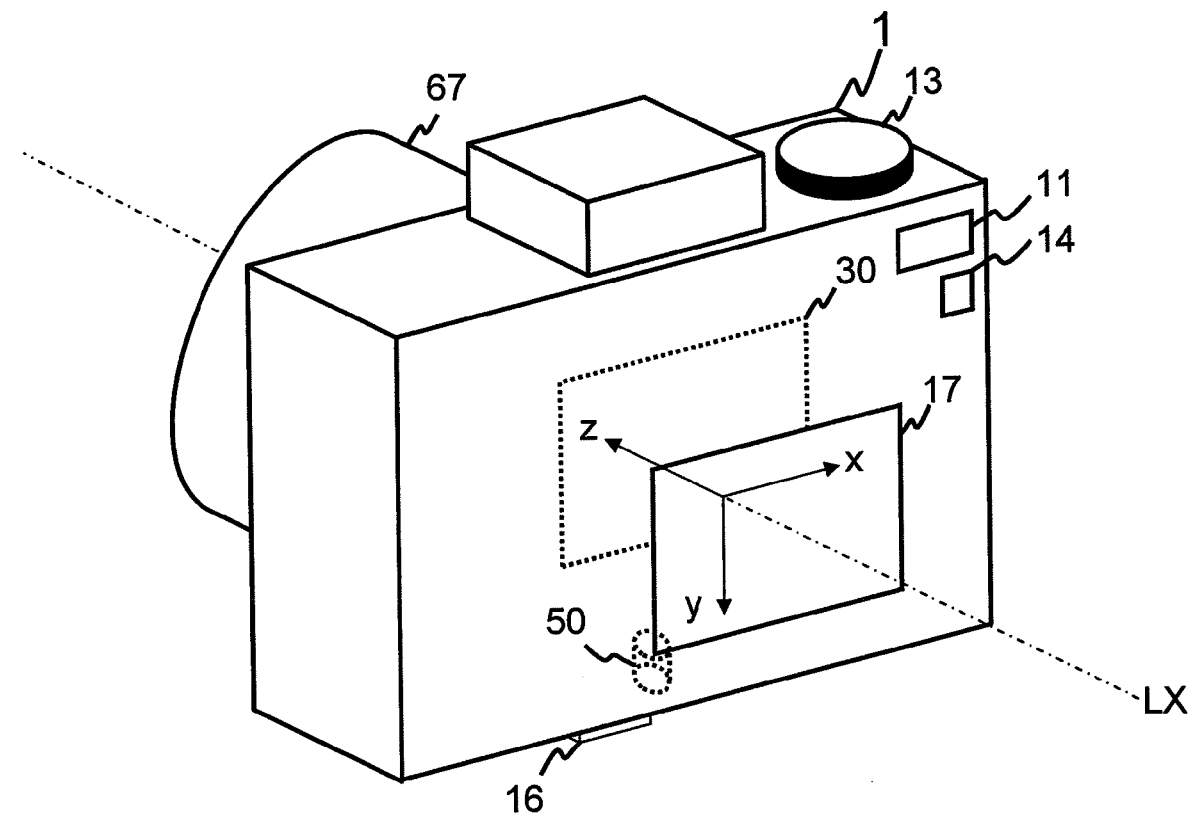
FIG. 19 is a perspective view of the embodiment of the photographic apparatus viewed from the rear, with the second inclination correction button on the lower surface and near the tripod hole.
Figure 20:
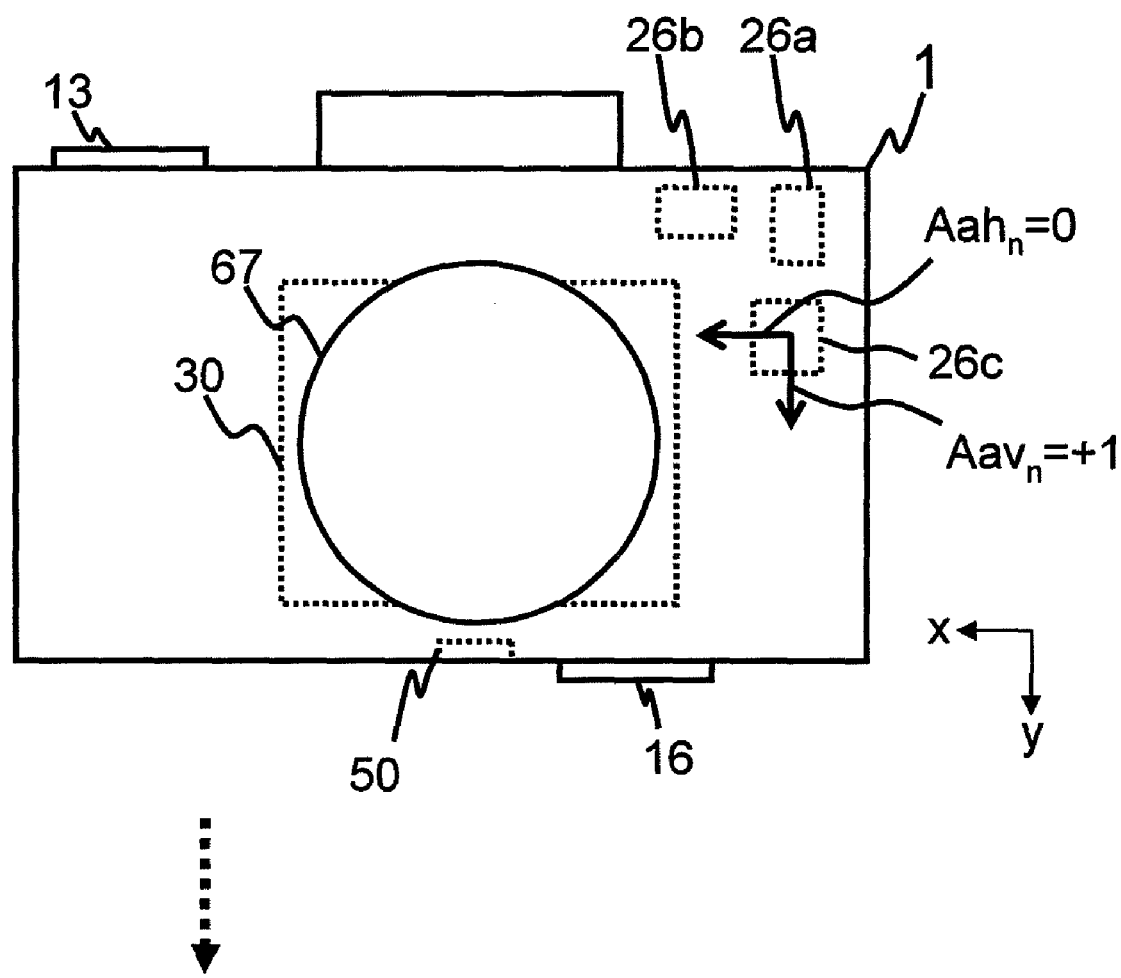
FIG. 20 is a front view of the photographic apparatus, when the photographic apparatus is held in the first horizontal orientation, with the second inclination correction button on the lower surface and near the tripod hole.

Furthermore, the second inclination correction button 16 may be arranged on the lower surface of the photographic apparatus 1, near a tripod hole 50 of the photographic apparatus 1, so as to contact with a camera mount of the tripod when the photographic apparatus 1 is attached to the tripod (see FIGS. 19 and 20).

In this case, when the photographic apparatus 1 is attached to the tripod, the second inclination correction button 16 is depressed by the camera mount of the tripod.

Therefore, the ON/OFF control of the inclination correction can be operated by attaching the photographic apparatus 1 with the tripod, without manual operation by the operator who holds the photographic apparatus 1.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2008-090838 (filed on Mar. 31, 2008), which is expressly incorporated herein by reference, in its entirety.

The invention claimed is:

1. A photographic apparatus comprising:
a movable platform which has an imager that captures an optical image through a taking lens, and is movable and rotatable in an xy plane perpendicular to an optical axis of said taking lens;
a translational movement switch that is used for selecting ON/OFF states of a translational movement including at least one of a first stabilization and a second stabilization, said first stabilization moving said movable platform in an x direction for correcting hand shake caused by yaw, said second stabilization moving said movable platform in a y direction for correcting hand shake caused by pitch, said x direction being perpendicular to said optical axis, said y direction being perpendicular to said x direction and said optical axis;
a rotational movement switch that is used for selecting ON/OFF states of a rotational movement that rotates said movable platform in said xy plane;
a controller that controls said movable platform for said translational movement on the basis of the state of said translational movement switch, and said rotational movement on the basis of the state of said rotational movement switch; and
an operation member;
wherein the ON/OFF states of said rotational movement switch change according to an operation state of said operation member; and
wherein said operation member is arranged such that said optical axis is arranged between said operation member and a shutter release button of said photographic apparatus.

2. A photographic apparatus comprising:
a movable platform which has an imager that captures an optical image through a taking lens, and is movable and rotatable in an xy plane perpendicular to an optical axis of said taking lens;
a translational movement switch that is used for selecting ON/OFF states of a translational movement including at least one of a first stabilization and a second stabilization, said first stabilization moving said movable platform in an x direction for correcting hand shake caused by yaw, said second stabilization moving said movable platform in a y direction for correcting hand shake caused by pitch, said x direction being perpendicular to said optical axis, said y direction being perpendicular to said x direction and said optical axis;
a rotational movement switch that is used for selecting ON/OFF states of a rotational movement that rotates said movable platform in said xy plane;
a controller that controls said movable platform for said translational movement on the basis of the state of said translational movement switch, and said rotational movement on the basis of the state of said rotational movement switch; and
an operation member;
wherein the ON/OFF states of said rotational movement switch change according to an operation state of said operation member; and
wherein said operation member is arranged on a lower surface of said photographic apparatus.

3. The photographic apparatus according to claim 2, wherein said operation member is arranged near a tripod hole of said photographic apparatus at a position where said operation member contacts with a camera mount of a tripod when said photographic apparatus is attached to said tripod.

4. A photographic apparatus comprising:
a movable platform which has an imager that captures an optical image through a taking lens, and is movable and rotatable in an xy plane perpendicular to an optical axis of said taking lens;
a translational movement switch that is used for selecting ON/OFF states of a translational movement including at least one of a first stabilization and a second stabilization, said first stabilization moving said movable platform in an x direction for correcting hand shake caused by yaw, said second stabilization moving said movable platform in a y direction for correcting hand shake caused by pitch, said x direction being perpendicular to said optical axis, said y direction being perpendicular to said x direction and said optical axis;
a rotational movement switch that is used for selecting ON/OFF states of a rotational movement that rotates said movable platform in said xy plane;
a controller that controls said movable platform for said translational movement on the basis of the state of said translational movement switch, and said rotational movement on the basis of the state of said rotational movement switch; and
an operation member;
wherein the ON/OFF states of said rotational movement switch change according to an operation state of said operation member; and
wherein said rotational movement switch is an auto regression type switch that is set to the ON state only when said operation member is operated, and that is set to the OFF state when the operation of said operation member is cancelled.

* * * * *